United States Patent
Nemazie et al.

(10) Patent No.: US 6,560,055 B1
(45) Date of Patent: May 6, 2003

(54) ID-LESS FORMAT DEFECT MANAGEMENT FOR AUTOMATIC TRACK PROCESSING INCLUDING TRANSLATION OF PHYSICAL SECTOR NUMBER INTO LOGICAL SECTOR NUMBER

(75) Inventors: Siamack Nemazie, San Jose, CA (US); John Schadegg, Niwot, CO (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 08/434,457

(22) Filed: May 2, 1995

Related U.S. Application Data

(63) Continuation of application No. 08/206,096, filed on Mar. 3, 1994.

(51) Int. Cl.[7] ............................................. G11B 5/09
(52) U.S. Cl. ......................................... 360/53; 360/77.02
(58) Field of Search ........................... 360/53, 48, 135, 360/72.2, 72.1, 54, 49, 77.02, 63; 364/468; 365/218; 369/58, 54; 371/42, 21.6, 10.2; 395/425, 500

(56) References Cited

U.S. PATENT DOCUMENTS

| | | | |
|---|---|---|---|
| 4,209,809 A | * | 6/1980 | Chang et al. .................. 360/53 |
| 4,297,737 A | | 10/1981 | Andresen et al. ........... 360/135 |
| 4,498,146 A | | 2/1985 | Martinez .................... 395/425 |
| 4,504,873 A | * | 3/1985 | Bandy et al. ................. 360/63 |
| 4,507,693 A | | 3/1985 | Matsuda et al. ........... 360/72.2 |
| 4,656,532 A | | 4/1987 | Greenberg et al. ............ 360/48 |
| 4,736,341 A | * | 4/1988 | Rodmond et al. .......... 395/500 |
| 4,827,423 A | | 5/1989 | Beasley et al. ............. 364/468 |
| 4,914,530 A | | 4/1990 | Graham et al. ............... 360/48 |
| 4,924,331 A | | 5/1990 | Robinson et al. .......... 360/72.1 |
| 4,935,825 A | | 6/1990 | Worrell et al. ................ 360/54 |
| 5,075,804 A | | 12/1991 | Deyring ....................... 360/49 |
| 5,111,444 A | | 5/1992 | Fukushima et al. ........... 369/58 |
| 5,172,381 A | | 12/1992 | Karp et al. .................... 371/42 |
| 5,200,864 A | | 4/1993 | Dunn et al. .................... 360/48 |
| 5,200,959 A | | 4/1993 | Gross et al. ................ 371/21.6 |
| 5,235,585 A | | 8/1993 | Bish et al. ..................... 369/54 |
| 5,255,136 A | | 10/1993 | Machado et al. ......... 360/77.02 |
| 5,270,877 A | | 12/1993 | Fukushima et al. ........... 360/48 |
| 5,270,979 A | | 12/1993 | Harari et al. ................ 365/218 |
| 5,271,018 A | | 12/1993 | Chan ......................... 371/10.2 |
| 5,367,652 A | * | 11/1994 | Goldon et al. ......... 360/72.1 X |
| 5,386,402 A | * | 1/1995 | Iwata ....................... 360/49 X |

FOREIGN PATENT DOCUMENTS

JP           58219658       * 12/1983

* cited by examiner

Primary Examiner—David Hudspeth
Assistant Examiner—Varsha A. Kapadia
(74) Attorney, Agent, or Firm—Maryam Imam, Esq.; Steven Lin, Esq.

(57) ABSTRACT

Defect management for automatic track processing without an ID field, processes defect information for a track on a magnetic media within a disk drive system. A system which uses any method of defect management including linear replacement, sector slipping, cylinder slipping or segment slipping, can be supported. A physical sector number for each sector is translated to a logical sector number relating to the order of data on a track. This translation of the physical sector number to a logical sector number for automatic track processing can be accomplished using any one of three methods: 1) a track defect table can be built in the buffer RAM; 2) the defect information can be written in the header of every sector; or 3) a system FIFO, located in the onboard logic, can be used to manage the defect list. In the second method, the header subfield comprises four defect records. In the third method, if there are more defect records for the track than will fit in the FIFO, then the first and second banks are each loaded while the other is being processed in a ping-pong manner until all of the defect records for the track have been processed. A defect record includes a physical sector number of the defective sector, an offset number and a flag indicating whether or not the defective sector has been slipped. Defect flags are automatically generated by the system for each defective sector.

10 Claims, 15 Drawing Sheets

MAX_SECTORS_PER_TRACK = 32    SPARE_SECTORS_PER_TRACK = 1

D = Defective Sector, S = Spare
MAX_SECTORS_PER_SEGMENT = 128    SPARE_SECTORS_PER_SEGMENT = 2

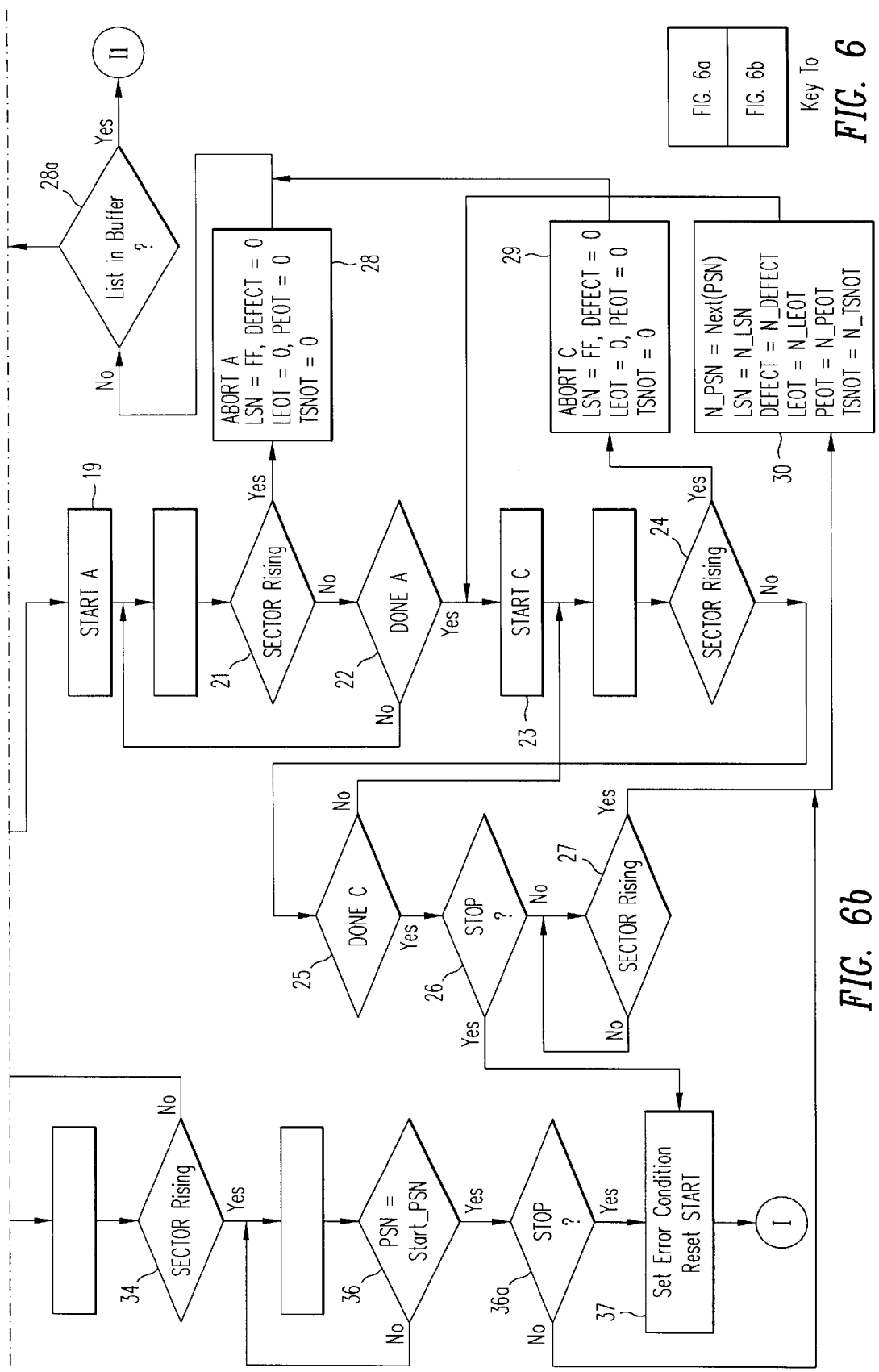

Key To

Key To

ID-LESS FORMAT DEFECT MANAGEMENT FOR AUTOMATIC TRACK PROCESSING INCLUDING TRANSLATION OF PHYSICAL SECTOR NUMBER INTO LOGICAL SECTOR NUMBER

This is a File Wrapper Continuation of copending application Ser. No. 08/206,096 filed Mar. 3, 1994.

FIELD OF THE INVENTION

The present invention relates to the control of storage systems for digital computers. More particularly, the present invention relates to a defect management method and apparatus for a rotating media storage system.

BACKGROUND OF THE INVENTION

An example of a magnetic media platter with embedded servo fields is illustrated in FIG. 1. These servo fields may also be referred to as servo bursts or servo marks. Each concentric circle schematically represents one track which is subdivided into multiple sectors and each radial line extending from the center outward, represents a servo field. A servo field contains data which are pre-written on the disk, during manufacturing of the disk, concerning the location of the servo field and the track on the disk for positioning of the read/write head relative to a particular track. The servo fields are then used by the controller for positioning of the read/write head during read and write operations. It is imperative therefore, that the data within the servo fields not be written over. In order not to write over the data within a servo field, the controller must know where the servo fields are and be able to suspend write operations over that area.

The usable regions for storage on the disk are located on the tracks, between the servo fields. Data to be stored on the disk are written in these regions between the servo fields, which will be referred to as a data region. The recording of data within these regions is measured in bits per inch (BPI). Assuming a constant bit density to record a bit, the number of bits which can be recorded between servo fields is much less for the inner circle, track 0, than the number of bits which can be recorded in the outermost circle, track N. Though possible, it is impractical to provide a unique recording and reading speed for each track. In order to take advantage of the higher storage potential of the outer tracks without exceeding the allowable density on the inner tracks, the disk is divided into multiple zones and a method of zone bit recording is used. The tracks are grouped into zones such that all the tracks in one zone are adjacent to each other. The data rate at which data are written to or read from the disk is constant for all tracks within a zone and different for each zone. Because the disk is rotated at the same speed for all the zones, in order to take advantage of the greater recording area of the outer zones, the recording speed is increased for the outer zones on the disk.

The data to be stored on a disk are broken up into manageable portions called sectors. Multiple sectors are generally stored on each track. An example of a typical format of a sector is illustrated in FIG. 2a. Each sector includes an ID field, a GAP field, a DATA field and a PAD field. The ID field is the unique identification tag for each sector in a track of a disk drive media and differentiates one sector from another. Within the ID field are four subfields, the ID PLO subfield, the ID AM subfield, the ID subfield and the CRC subfield. The ID PLO subfield is a multiple byte field of a known pattern which is used by the phase lock loop of the encoder/decoder (ENDEC) to synchronize to the incoming data stream. The ID AM subfield is a known pattern which is used by the drive controller to synchronize or align to the beginning of the ID subfield. This synchronization is necessary to align the disk controller to a data byte boundary, in order to differentiate each segment of data to a particular field. The ID subfield follows the ID AM subfield and contains the actual identification for the sector, including multiple bytes used to specify the address of the sector on the disk. The number of bytes within the ID subfield is at the discretion of the manufacturer of the disk drive and is controlled by the format of the particular disk drive used. The number of bytes within the ID subfield is the same for every sector and can comprise a cylinder high byte, a cylinder low byte, a sector number byte, a head number byte and a byte or two for defect management. The ID subfield is then followed by a fixed number of error detection bytes in the CRC subfield which are used to detect any errors in the ID field. Some formats, referred to as ID_Less formats, do not use an ID field, but rather use a header subfield within the DATA field.

The GAP field is a fixed number of bytes which are used to separate the ID field from the DATA field. The DATA field includes a DATA subfield and an error correction code (ECC) subfield. The DATA subfield is the portion of the sector where the actual data, which is communicated between the host computer and the disk drive, is stored. The ECC subfield is a fixed number of bytes tagged on to the end of the DATA subfield which are used to detect and correct soft or hard errors on the media within the capability of the code. The ECC subfield is used to avoid the transfer of erroneous data to and from the host computer.

A typical ID_Less sector format is illustrated in FIG. 2b. In ID_Less formats, the ID field is replaced by a header subfield within the DATA field, thus combining the identification data and the DATA field into one field and reducing the number of bits necessary for each sector. The header subfield can be brought under the protection of the same ECC field as the DATA field and therefore afforded the same protection as the DATA field. The CRC field associated with the header subfield can be decreased or eliminated, further reducing the overhead of the system and eliminating the hardware which generates the CRC field. In ID_Less formats, all of the information in the sector header may be predetermined by reading a small number of other sector headers on the track, usually one. The sync field or PLO field in an ID_Less format can be reduced in size or the reliability of the sync circuitry improved since the sync field will always occur immediately after a sector pulse.

The disk drive system performs three major operations: format, write and read. The disk drive can format the disk for storing data in the format supported by the system and the disk. The disk drive system also performs write operations to the disk to store data on the disk transmitted from the host computer to the disk drive system and read operations from the disk to read data from the disk and transmit it to the host computer. The disk is continuously rotating within the disk drive system, even as the read/write head moves between zones, which may cause the read/write head to cross over one or more servo fields as it travels from one track or zone to another track or zone. The controller circuit knows the angular position of the read/write head, but as the read/write head changes tracks between different zones, the number of sectors between servo marks changes, because of the change in bit density between zones. The controller does not know how to translate this angular position after a zone change into a known position on the track relative to the sectors and may be unable to determine the relative positioning of the sector pulses on the specific track. To re-orient itself on the disk, the hard disk controller will normally wait for the INDEX mark and orient itself from the INDEX mark for the track that it is on. However, waiting for the INDEX mark during a read or write operation increases the latency in reaching the next desired sector. This delay adds to the seek latency of the disk drive system.

DEFECTS

After a recording media is manufactured it is tested by the manufacturer to determine the validity of each sector. Defects may be introduced during the manufacturing process which will damage a sector and prevent data from being stored in or retrieved from that sector. Defects are flaws within the medium, usually resulting from the presence of dust particles and other aberrations during the manufacturing process, that make a portion of the medium, usually a single sector, unsuitable for the storage of information.

The number of defects on a disk increases as the storage capacity per unit area of the disk drive system increases. Therefore as the storage capability of the storage medium is increased, it becomes more difficult and expensive manufacture flawless storage devices. It also becomes cost prohibitive to discard all of the flawed devices. For these reasons it is desirable to develop a scheme which allows a system with defects occurring on its medium to be saved and not discarded.

The manufacturer will identify the defective sectors which are detected after the manufacturing process in a list of defects, known as the "primary defect list" or "manufacturer's defect list." This list is stored directly on the disk in a reserved space, usually outside of the boundaries of the data tracks. Additional defective sectors, known as secondary or "grown" defects may be detected after the manufacturer's primary list has been compiled. A list of these "grown" defects are maintained and stored in a secondary defect list also on the disk in a reserved space.

The primary and secondary lists are read from the disk and stored in the random access memory (RAM) upon power up of the disk drive system. The system controller then uses the information from the primary and secondary lists to manage the defects and avoid writing data to bad or defective sectors.

LINEAR REPLACEMENT

Many different defect management schemes have been used in the past. Using the method of linear replacement for defect management the defective sectors are flagged and mapped to a good sector somewhere else on the disk, which is substituting for the defective sector, causing the system to jump from the defective sector to the good sector and then back to the defective sector in order to read or write the data on the disk in a consecutive order. This mapping technique adds considerable latency to the system and degrades its performance because of the required jumps from the defective sectors to the mapped substituting good sector and back. Each sector on a track is identified consecutively by a physical address or physical sector number, representing the actual location of the sector on the track. A logical sector number is used by the system controller to read data from and write data to the disk drive.

An example of a system using the method of linear replacement is illustrated in FIG. 3a. The first track includes one spare sector at the physical sector number 31 and has two defective sectors at the physical sector numbers 1 and 2. The first defective sector is flagged as a defective sector and is mapped to the spare sector at the physical sector number 31 which is labelled as the logical sector number 1. Because the spare sector on the first track has been used, the second defective sector at the physical sector number 2 is flagged as a defective sector that is mapped off the track. The physical sector number 2 is labeled as the logical sector number 2 and the system must travel to another track in order to read the data from or write the data to the sector which is substituting for the defective physical sector number 2 and then travel back to the first track in order to read or write the information in a consecutive order.

An associated mapping value accompanies the second defective sector to inform the system where the substituting sector is located on the disk. This associated mapping value can be found in a pointer within the ID field of the defective sector or can be found in a defect table which lists all of the defective sectors and their associated substituting sectors.

The disadvantage of the method of linear replacement is that it requires extra seeks to be performed by the system if the system is to read or write the data in a consecutive order corresponding to the logical sector numbers. For the system illustrated in FIG. 3a to read the data from the first track in a consecutive order corresponding to the logical sector numbers it will read the logical sector number 0 first. To read the logical sector number 1 the system must jump to the physical sector number 31. When the logical sector number 1 has been read the system must then jump back to the logical sector number 2, which is located at the physical sector number 2. Because the logical sector number 2 is defective the system is pointed to the substituting sector on another track and must travel to that sector in order to read the data in the logical sector number 2. After the logical sector number 2 has been read the system then must travel back to the first track and read the remainder of the logical sector numbers 3–30 in a consecutive order. This method adds many extra seeks to the system and thereby increases the latency of the system.

SECTOR SLIPPING

An improvement over the linear replacement technique is the method of sector slipping which also uses spare sectors assigned to each track to avoid the defective sectors, but does not require as many seeks to be performed by the system. Each sector on a track is identified consecutively by a physical address or physical sector number, representing the actual location of the sector on the track. The sectors are numbered from zero to N−1, consecutively from the INDEX mark, where N is the number of sectors on the track. The sectors on a track are also identified by a logical sector number corresponding to their position within the sequence of data stored on the track. The logical sector number is used by the controller to read data from and write data to the disk drive. Not every sector will be assigned a logical sector number.

A typical system employing sector slipping will include spare sectors at the end of each track. In a sector slipping scheme the defective sector is mapped to the next good sector on the track until all spare sectors are used. During formatting of the disk drive, logical sectors are assigned consecutively from a first sector on the track to the last sector, slipping defective sectors until all spare sectors on the track are used.

FIG. 3b illustrates a typical track having thirty two sectors, numbered zero through thirty one where the last sector of the track is a spare. In the track of FIG. 3b there are no defective sectors and therefore the spare sector 31 is not used. FIG. 3c illustrates a track with a defective sector at the physical sector number 2. As can be seen from FIG. 3c, the logical sector numbers are slipped after the defective sector and the spare sector is used as the logical sector number 30.

After the track has been formatted and the logical sectors are mapped out, the system then performs a calculation to determine the location of the target sector which it must read from or write to. In the case of FIG. 3c, if the system was instructed to read from a sector having a target logical sector number 26, the system would add the number of defects appearing before that sector, to that logical sector number to know the physical sector number of the target logical sector number. Therefore, because there is one defective sector before the physical sector number 26, the correct physical address for the target sector number 26 would be at the physical sector number 27.

When the number of defects on a track is greater than the number of spares assigned to that track, the defective sectors are still slipped, but as soon as the number of defective sectors exceeds the number of spares on the track, the remainder of the defective sectors are not slipped, but are mapped to a sector on another track or somewhere else on the disk using the linear replacement method as described above. A system using the sector slipping method which includes a track with more defective sectors than spare sectors is illustrated in FIG. 3d. The first track in FIG. 3d includes one spare sector and two defective sectors. The first defective sector at the physical sector number 1 is skipped and the logical sector number 1 is slipped to the physical sector number 2 of the first track. The second defective sector at the physical sector number 29 is not slipped because the spare sector on the track has already been used. The logical sector number 28 is therefore flagged as a defective sector and mapped to a substituting sector somewhere else on the disk, in this case the spare sector at the physical sector number 31 on the track 1.

The method of sector slipping maintains the logical sectors in a consecutive order allowing the system to read or write the data in a consecutive order without extra seeks. Extra seeks are required when the number of defective sectors on the track or segment exceed the number of spare sectors assigned to the track or segment and the system must travel to another track or segment to read or write the data from a substituting spare sector and then back to the original track.

CIRCULAR SLIPPING

Circular slipping or wrapping is another defect management method which can be used to map the defective sectors to substituting sectors. In the method of circular slipping or wrapping, defective sectors are all slipped, even if the number of defective sectors exceeds the number of spare sectors. If the number of defects on the track does exceed the number of spares, then the defective sectors are used as logical sectors to ensure that each track has a fixed number of logical sectors. The defective sectors which are used as logical sectors are flagged as defective and are mapped to a substituting sector somewhere else on the disk.

A system employing circular slipping is illustrated in FIG. 3e. The first track of FIG. 3e includes one spare sector and has two defective sectors. Both of the defective sectors are slipped and the spare sector 31 is used as the logical sector number 29. Because the system expects thirty one logical sectors per track, the first defective sector is used as the logical sector number 30. This sector is flagged as defective and is mapped to a substituting sector somewhere on the disk, in this case the spare sector at the physical sector number 31 on the track 1.

In the systems of the prior art which utilize sector slipping or circular slipping, the defect information and flags referred to above were included in the ID field. In drives that use an ID_Less format the ID field is eliminated, and in general the sector must be identified without reading any subfield of the sector. It is therefore desirable for a system to automatically generate the defect information and corresponding flags.

SEGMENT SLIPPING

A segment is a set of logically related tracks which are positioned adjacent to each other on the disk or medium. The tracks within a segment are consecutively numbered from 0 to M. The physical sectors within a segment are consecutively numbered from 0 to SN−1, where SN is the number of physical sectors per segment, SL is the number of logical sectors per segment and P is the number of spare sectors per segment. Spare sectors are included at the end of a segment and defective sectors within a segment are slipped as described above for a track. The segment is treated as one contiguous storage space such that a defective sector is mapped to the next good sector within the segment and slipping occurs across the tracks within a segment. If the number of defective sectors for the segment exceeds the number of spare sectors included in the segment then the remainder of the defective sectors are mapped to substituting sectors somewhere else within the system. The concept of circular slipping can be applied to segment slipping, once the defective sectors within the segment exceed the spare sectors per segment, the remaining logical sectors are mapped to the defective sectors starting from the first defective sector within the segment. A special case of segment slipping is cylinder slipping where the segment is a cylinder of the disk.

A group of four tracks comprising a segment is illustrated in FIG. 5b. In the example of FIG. 5b, this segment or partition includes four tracks, each with thirty two physical sectors and two spare sectors at the end of the segment. A track base value TB for each track, specifies the beginning physical sector number PSN for the first sector of each track. A track displacement value TD includes the number of defective sectors in the tracks previous to the current track. The logical sectors are numbered consecutively throughout the segment, skipping the defective sectors. The first logical sector number of each track can be calculated by subtracting the track displacement value TD from the track base TB.

The first track in the example of FIG. 5b has a defective sector at the physical sector number 1. This defective sector is skipped and the physical sector number 2 is labelled as the logical sector number 1. The track displacement value TD for the second track is equal to one because of the one defective sector previous to the second track. The first logical sector number of the second track is therefore thirty one because the track base is thirty two and the track displacement value TD is one. The second track also includes a defective sector at the physical sector number 61. This defective sector is skipped and the physical sector number 62 is therefore labelled as the logical sector number 60. The track displacement value TD for the third track is equal to two because of the two defective sectors previous to the third track.

Automatic track processing requires hardware defect management and mapping the physical sector numbers on the track to logical sector numbers. This mapping of a physical sector number to a logical sector number must take into account the defect management strategy employed in the disk drive system and the skew, if any, of the system. A Logical Block Address (LBA) is a quantity which is kept for each non-defective sector and includes a cylinder number, a head or track number and a sector number. This LBA is translated to a Physical Block Address (PBA) which includes a cylinder, head and sector number. This translation is based on the assumption that there are a fixed number of logical sectors per track and/or segment.

One method which can be used to translate the LBA to a PBA, when the number of logical sectors per track is not constant, is based on the fact that the same address translation routine can be used if the target LBA is adjusted by the number of defective logical sectors with an LBA less than or equal to the target LBA that are slipped across the track. If there are no spare sectors used per track by the system then the adjustment will simply be the number of defective logical sectors with an LBA less than or equal to the target LBA. This translation method will require a table search. Other methods used for this translation will require extra seeks to perform the above translation if a segment slipping method is used.

SKEW

The skew of a system is a parameter which combines the head skew, the cylinder skew and the zone skew and represents the number of sectors that the system travels over as it changes from one cylinder or track to another or from one zone on the disk to another. For example, as the system travels from the end of one track to the beginning of a subsequent track, the system may travel over a number of sectors before it is ready to begin the operation for that track. The systems described above did not have a skew and began logically numbering the sectors from the INDEX mark. Disk drive systems which do have a skew value will begin the logical sector numbering of sectors on the track from the first sector at which the system is ready to begin the operation, which is not at the beginning of the track or the INDEX mark. These systems would then number the logical sectors consecutively, beginning from this sector and would continue numbering the sectors until this sector is again reached.

An example of this numbering system, taking into account the skew of a system, is illustrated in FIG. 4. The skew value of this system is five sectors and therefore the system begins logically numbering from the physical sector number 5. After taking into account the skew of the system, this system can then implement any one or a combination of all of the defect management schemes described above. When the system comes to the physical sector number 31, it is assigned a logical sector number 25. The system then wraps around to the beginning of the track and the next logical sector number on this track is the physical sector number 0 because of the skew of the system. Therefore, the physical sector number 0 is assigned a logical sector number 26. As the system jumps from this track to the next track, the skew of the system must again be taken into account and the first logical sector number of the next track will consequently be the physical sector number 10.

A system which uses an ID_Less format was taught by Greenberg et al. in U.S. Pat. No. 4,656,532 issued on Apr. 7, 1987. Under the method taught by Greenberg, the system, by reading a single header of a sector, can ascertain the location of the logical sectors on the track, as long as the number of defective sectors on the track is less than the number of defective sectors for which information can be stored in the header. If the number of defective sectors on the track exceeds the number of defective sectors for which information can be stored in the header, then more than one header will have to be used to ascertain the information for the track. The header includes the offset of the first logical sector on the track and the locations of the defective sectors on the track that must be skipped. The method of Greenberg translates the target logical sector number to a target physical sector number and counts the sector pulses until the target physical sector is reached. The method of Greenberg does not teach a translation algorithm for translation of physical sector number to a logical sector number, and does not teach a method of translating physical to logical sector numbers and comparing the logical sector number with the target sector number for sector identification. The method of Greenberg et al. does not teach using a defect table in memory or using a first-in first-out (FIFO) stack for processing the track defects.

What is needed is a defect management method and apparatus which can be used with ID_Less formats, wherein the ID and DATA fields of a sector are merged. What is further needed is a method for automatic sector identification and track processing for disk drive systems which use the ID_Less format. What is also needed is a system which automatically supports the defect management schemes of the prior art without any real time intervention by the microprocessor in disk drive systems which use the ID_Less format.

SUMMARY OF THE INVENTION

Defect management for automatic track processing without an ID field, processes defect information for a track on a magnetic media within a disk drive system. A system which uses any method of defect management including linear replacement, sector slipping, cylinder slipping or segment slipping, can be supported. A physical sector number for each sector is translated to a logical sector number relating to the order of data on a track. This translation of the physical sector number to a logical sector number for automatic track processing can be accomplished using any one of three methods: 1) a track defect table can be built in the buffer RAM; 2) the defect information can be written in the header of every sector; or 3) a system FIFO, located in the onboard logic, can be used to manage the defect list. In the second method, the header subfield comprises four defect records. In the third method, if there are more defect records for the track than will fit in the FIFO, then after initialization and loading the first and second banks of the FIFO by the drive microprocessor, the first and second banks are each loaded by the drive microprocessor while the other is being processed, in a ping-pong manner, until the track processing is complete. A defect record includes a physical sector number of the defective sector, an offset number and a flag indicating whether or not the defective sector has been slipped. Defect flags are automatically generated by the system for each defective sector.

DETAILED DESCRIPTION OF THE PREFERRED EMBODIMENT

In previous systems, the defect information, including the mapping of defective sectors to replacement sectors was contained in the ID field of the sector. The apparatus and method of the present invention can be used with systems which include an ID field in the sector and can also be used with systems which use the ID_Less format without an ID field. The apparatus and method of the present invention can also support the defect management schemes of the prior art described above automatically without any real time intervention by the microprocessor in disk drive systems which use the ID_Less format. The apparatus and method of the present invention also automatically generates four flags, which will be described below, for each defective sector.

The present invention can implement any of the prior art methods described above for mapping the defective sectors to good sectors depending on the method used by the system. The method of the preferred embodiment of the present invention employs the method of circular slipping or segment slipping. In this method, the defective sectors are slipped using sector slipping until the number of defective sectors on the track or segment exceeds the number of spares assigned to that track or segment. The number of spares assigned to the track or segment can be chosen to minimize the number of tracks or segments for which the number of defects will exceed the number of spares. When the number of spares has been exceeded by the number of defects on the track or segment, the method of the present invention will assign the sectors that would have been shifted out to the defective sectors on the track or segment, beginning with the first defective sector and continuing until the last defective sector on the track or segment. From the defective sector, this logical sector is then mapped to a substituting spare sector somewhere else on the disk.

By using the circular slipping method the number of logical sectors per track or segment can be kept constant. When the number of spare sectors on the track or segment is exceeded by the number of defective sectors, the system does not have to travel back to the original track but can travel directly to the next subsequent track. The system will have to perform extra seeks to read or write the data in a consecutive order corresponding to the logical sector numbers. However, by using this method the system will save a seek over the other methods because when the last logical sector is read or written to, the system does not have to travel back to the original track but can travel directly to the next subsequent track.

Figure 5A:
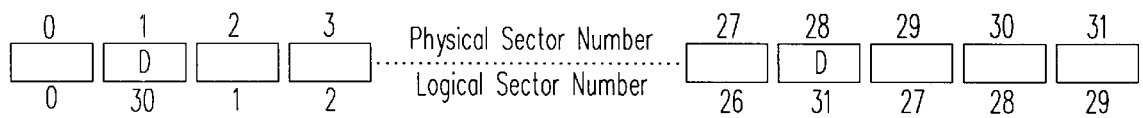
FIG. 5a illustrates an example of a track with one spare sector and two defective sectors.
Figure 5B:
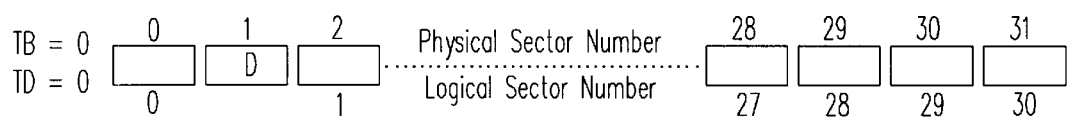
FIG. 5b illustrates an example of a cylinder slipping method within a prior art system for a cylinder including four tracks.
Figure 5B:
Figure 5B:
Figure 5B:

FIG. 5a illustrates an example of a track where the number of defective sectors exceeds the number of spares assigned to that track. The track of FIG. 5a has one spare assigned to it and two defective sectors. The track has thirty one logical sectors and one spare sector. The physical sector numbers 1 and 28 are defective and are slipped, as is illustrated in FIG. 5a. To keep the number of logical sectors on each track constant, the logical sector number 30 is assigned to the first defective sector, the physical sector number 1. The logical sector number 30 must be flagged as defective and additional information must also be kept so that the system will know the location of the spare substituting sector where this sector is mapped to on the disk.

An offset value is kept for each defective sector and is used to inform the system where the substituting sector for the defective sector can be found. The offset value is a user defined value and is programmed according to the defect management scheme employed by the system. The offset value is a pointer which will inform the system where the substituting sector is on the disk.

MAPPING WHEN SYSTEM SKEW IS EQUAL TO ZERO

The defect information of the track includes an ordered list, based on an increasing defect physical sector number, wherein the entry for each defective sector includes a physical sector number, an associated offset value and a binary valued flag SLIPPED, which indicates whether the sector has been slipped. In the system of the present invention, a hexadecimal value of FF is not a valid defect sector number or a valid physical or logical sector number and is a default value used to signal that this is a defective sector and that this defective sector is not used for the mapping of a logical sector.

The associated offset value is user defined, and is used for mapping the defective sectors to alternate sectors. Since the apparatus of the present invention uses the offset value as described below in detail, the user defined offset value must conform to these restrictions. When the SLIPPED flag is at a logical low voltage level, then a non-zero offset value less than or equal to the number of spare sectors per track indicates that the substituting sector is a spare sector on the same track. When the SLIPPED flag is at a logical low voltage level then a non-zero offset value greater than the number of spare sectors per track indicates that the alternate sector is not on the same track. When the SLIPPED flag is set to a logical high voltage level, a non-zero offset value indicates that the defective sector is mapped to a logical sector which is not on the track. The defective spare sectors are included in the list of defect records, however the offset value for a defective spare sector should be zero. When the flag SLIPPED is set to a logical high voltage level, this indicates that the defective sector is slipped. When the flag SLIPPED is reset to a logical low voltage level, this indicates that the defective sector is not slipped.

The number of spare sectors per track is kept in a register SP. The number of sectors per physical track is stored in the register N and the number of logical sectors per track is stored in the register L. The values SP, N and L are not embedded in the defect information on the track but are initialized by the apparatus of the present invention for each zone.

The apparatus of the present invention keeps track of the physical sector number and based on the track defect information, maps the physical sector number to a logical sector number. The apparatus of the present invention also keeps track of and automatically generates four flags, a DEFECT flag, a LOGICAL END OF TRACK (LEOT) flag, a PHYSICAL END OF TRACK (PEOT) flag and a TARGET SECTOR NOT ON TRACK (TSNOT) flag. The DEFECT flag, when set to a logical high voltage level, indicates that the defective sector is mapped to a spare sector off of the track.

Mapping of the physical sector number to a logical sector number requires the apparatus of the present invention to scan the track defect information and compute the number of defective sectors on the track that are slipped, represented by the value SD, the logical sector number of the last logical sector on the track, represented by the value X, the logical sector number of the last good sector on the track, represented by the value Z, and the logical sector number of the defective sectors on the track that are skipped and mapped to the spare sectors on the track. The first logical sector number that is skipped and mapped to a spare sector on the track is represented by the value SKIP1_LSN. The second logical sector number that is skipped and mapped to a spare sector on the track is represented by the value SKIP2_LSN. A hexadecimal value of FF for the values SKIP1_LSN and SKIP2_LSN indicates that there was no defective sector on the track that was skipped and mapped to a spare sector on the track. Note that the hexadecimal value of FF for the values SKIP1_LSN and SKIP2_LSN does not indicate that the spare sectors were not used because defective sectors on other tracks could have been mapped to the spare sectors on the current track.

The logical sector number of the last good sector on the track Z and the logical sector number of the last logical sector on the track X are computed using the following equations:

$$Z = (N-1) - SD \quad (1)$$

$$X = (L-1) \text{ If } SP \geq SD, \text{ Else } X = Z \quad (2)$$

Using the above equations for the track illustrated in FIG. 5a, the number of sectors per physical track N is equal to thirty two, and the number of defective sectors on the track that are slipped SD is equal to two. The logical sector number of the last good sector on the track Z is therefore equal to twenty nine. The number of spare sectors per track SP is equal to one and is therefore not greater than the number of defective sectors on the track that are slipped SD. The logical sector number of the last logical sector on the track X is therefore equal to the logical sector number of the last good sector on the track Z, which is equal to twenty nine.

The apparatus of the present invention begins its computations for a track by initializing the number of defective sectors on the track that are slipped SD to zero, the logical sector number of the first defective sector on the track SKIP1_LSN to the hexadecimal value FF, the logical sector number of the second defective sector on the track SKIP2_LSN to the hexadecimal value FF, the logical sector number of the last logical sector on the track X to the number of logical sectors per track L minus one and the logical sector number of the last good sector on the track Z to the number of sectors per physical track N minus one. A value of one is subtracted from the previous values because the system of the present invention begins numbering the sectors, both logically and physically, from zero. Alternatively, the sectors on each track could be numbered beginning from one and then the value of one would not have to be subtracted from the previous values.

The apparatus of the present invention will next scan the defect information for the track and the entry in the defect list for each defective sector of the track. If the defect sector number DSN is not equal to a hexadecimal value of FF and if the SLIPPED flag is equal to a logical high voltage level, then the apparatus will increment the number of defective sectors on the track that are slipped SD and the logical sector number of the last good sector on the track Z is decremented. Otherwise, if the defect sector number DSN is equal to a hexadecimal value of FF or if the SLIPPED flag is not equal to a logical high voltage level, and the offset value OFFSET is equal to a value of one or two, signalling that one of the spare sectors was used for this defective sector, then the logical sector number associated with the defective sector number DSN is saved in one of the registers SKIP1_LSN or SKIP2_LSN. The apparatus of the present invention repeats this process for all of the defective sectors on the track. When the apparatus of the present invention finishes these calculations for the defective sectors on the track, if the logical sector number of the last good sector on the track Z is less than the number of sectors for the logical track L minus one, then the logical sector number of the last logical sector on the track X is set equal to the logical sector number of the last good sector on the track Z.

After the apparatus of the present invention computes the values for the logical sector number of the last logical sector on the track X, the logical sector number of the first defective sector on the track SKIP1_LSN and the logical sector number of the second defective sector on the track SKIP2_LSN, it then goes through the track sector by sector and assigns the logical sector numbers to the sectors on the track. If a physical sector number PSN is not a defect sector number DSN, then the corresponding logical sector number LSN is equal to the physical sector number PSN minus the number of slipped defective sectors between the physical sector number 0 and the physical sector number PSN. Otherwise, if the physical sector number PSN is a defect sector number DSN, then the sector is wrapped and the corresponding logical sector number LSN is equal to the logical sector number of the last logical sector on the track X plus the number of slipped defective sectors between the physical sector number 0 and the current physical sector number PSN.

MAPPING WHEN SYSTEM SKEW IS NOT EQUAL TO ZERO

In the previous discussion the system skew was assumed to be equal to zero. However, for practical application, additional calculations need to be performed before the physical sector numbers can be mapped to logical sector numbers, in order to handle the more general case of a non-zero skew. With a non-zero skew the physical sector number PSN is first mapped to a skew adjusted physical sector number F(PSN) prior to mapping to a corresponding logical sector number LSN. The skew adjusted physical sector number F(PSN) is calculated using the following equation:

$$F(PSN)=PSN-\text{SKEW if } PSN \geq \text{SKEW, Else } N+PSN-\text{SKEW} \quad (3)$$

Figure 1:
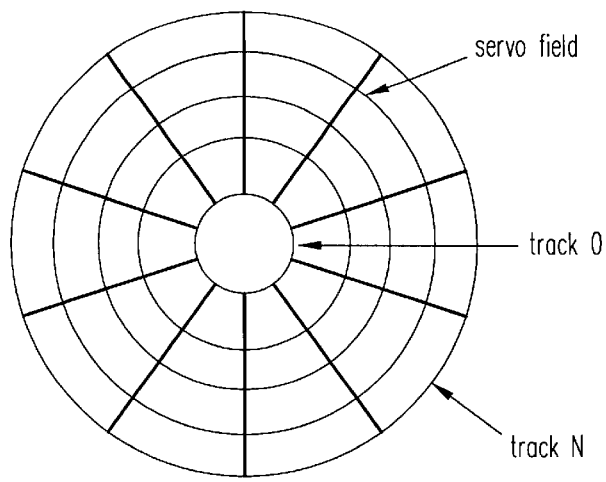
FIG. 1 illustrates a magnetic media platter of the prior art with embedded servo fields.
Figure 2A:
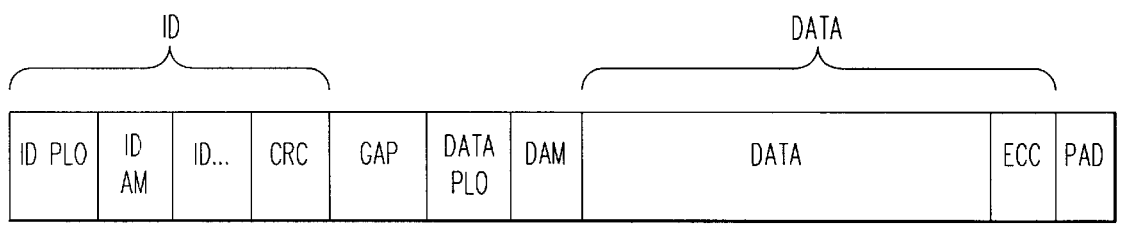
FIG. 2a illustrates the format of a typical sector of the prior art.
Figure 2B:
FIG. 2b illustrates the format of a typical ID_Less sector of the prior art.
Figure 3A:
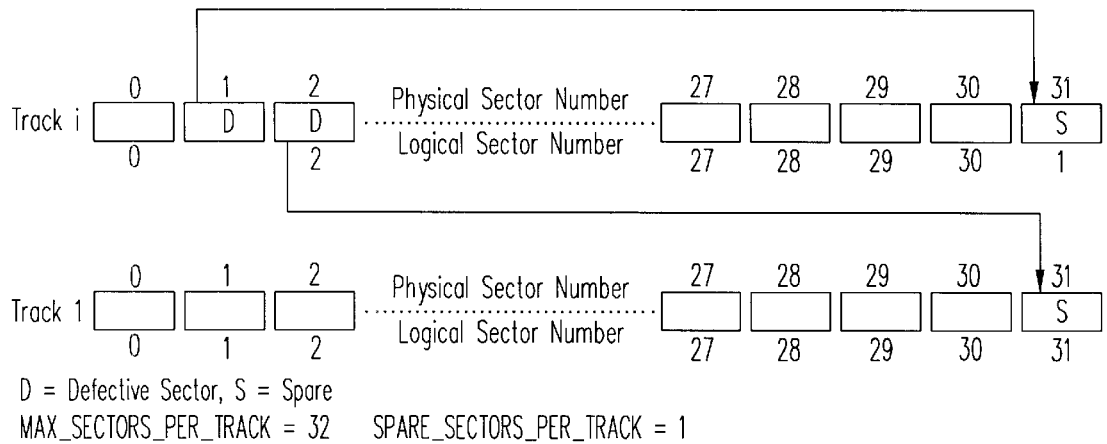
FIG. 3a illustrates a typical track within a prior art system using the linear replacement method of defect management.
Figure 3B:
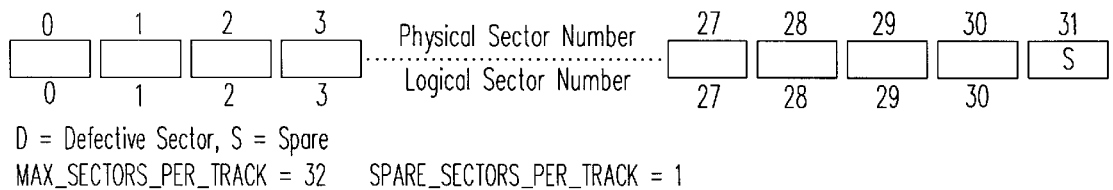
FIG. 3b illustrates a typical track of a prior art system having thirty two sectors, including one spare sector.
Figure 3C:
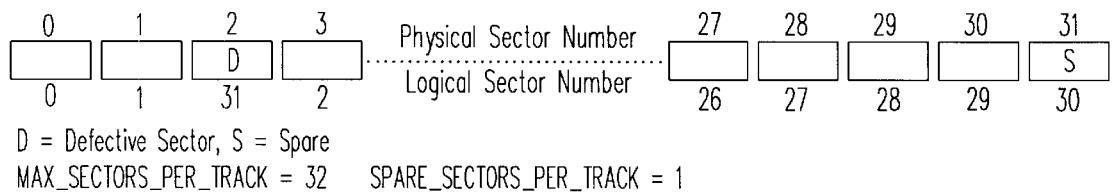
FIG. 3c illustrates a typical track of a prior art system including one slipped defective sector.
Figure 3D:
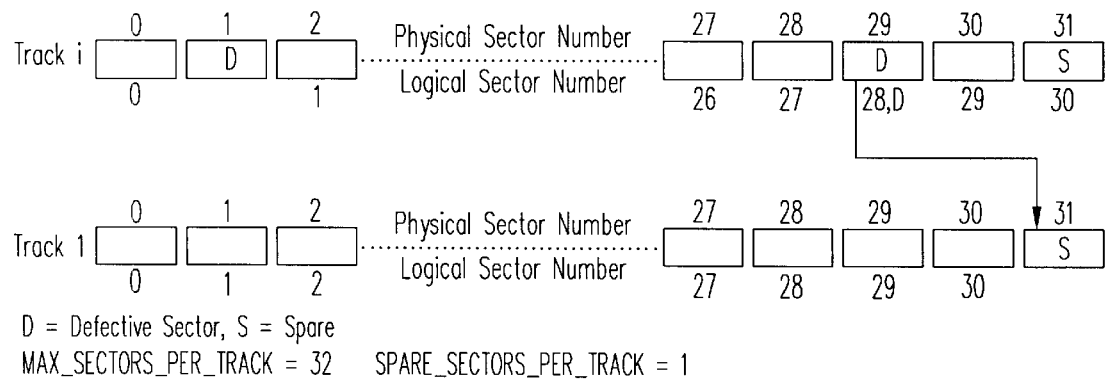
FIG. 3d illustrates a prior art system using a sector slipping method of defect management.
Figure 3E:
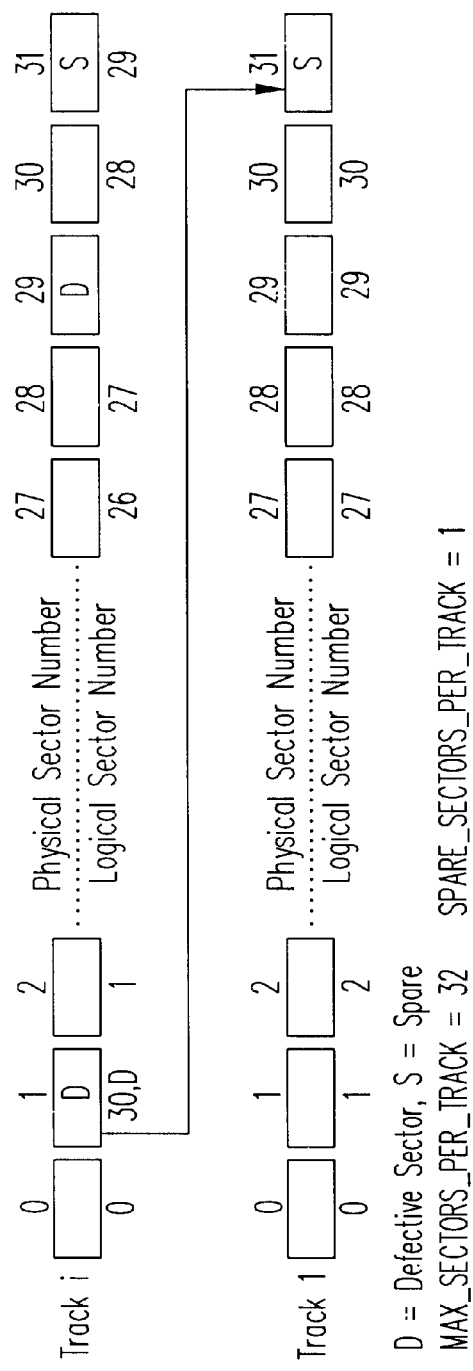
FIG. 3e illustrates a prior art system using a circular slipping method of defect management.
Figure 4:
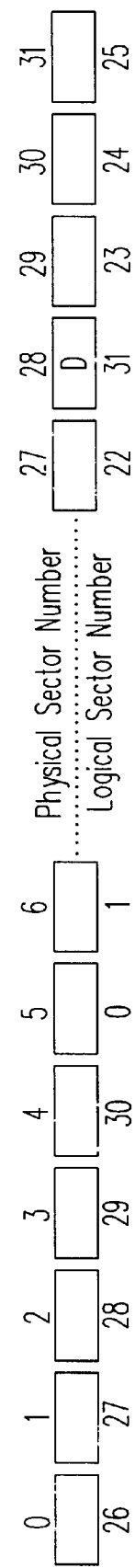
FIG. 4 illustrates a track within a prior art system having a skew value of five sectors.

The value N in equation (3) is equal to the number of sectors per physical track. FIG. 4 which was discussed above can be used to illustrate the above calculations. If the skew of the system is equal to five, then the skewed physical sector number F(PSN) for any of the sectors after the physical sector number 4 is equal to the physical sector number minus five, the skew of the system and the skewed physical sector number F(PSN) for any of the sectors before the physical sector number 5 is equal to the number of sectors for the physical track N, which in this case is thirty two, plus the physical sector number minus five, the skew of the system. The skewed physical sector number F(PSN) for the physical sector number 29 would be equal to 24. The skewed physical sector number F(PSN) for the physical sector number 2 would be equal to 29.

To calculate the logical sector number LSN from the skewed physical sector number F(PSN) the following equations are used for a physical sector number which is not equal to a defective sector number DSN:

$$\text{IF } PSN<\text{SKEW then } LSN=N+PSN-\text{SKEW}-bx; \quad (4)$$

where bx=b+c2

$$\text{IF } PSN \geq \text{SKEW then } LSN=PSN-\text{SKEW}-bx; \quad (5)$$

where bx=b−c1
For a physical sector number which is equal to a defective sector number which is slipped:

$$\text{If } PSN<\text{SKEW then } LSN=X+bx \quad (6)$$

where bx=b+c2

$$\text{If } PSN \geq \text{SKEW then } LSN=X+bx \quad (7)$$

where bx=b−c1
In the above equations, the value b is equal to the number of defective sectors between the physical sector number 0 and the physical sector number PSN. The value c1 is equal to the number of defective sectors between the physical sector number 0 and the physical sector number corresponding to the skew of the system. The value c2 is equal to the number of defective sectors between the physical sector number corresponding to the skew of the system and the physical sector number corresponding to the number of sectors per physical track N.

In the track illustrated in FIG. 4, having a skew equal to five, the value of c1 is equal to zero because there are no defective sectors between the physical sector number 0 and the physical sector number corresponding to the skew of the system, in this example the physical sector number 4. The value of c2 is equal to one because there is one defective sector between the physical sector number 4 and the physical sector number corresponding to the number of sectors per physical track N, in this example the physical sector number 31. For physical sector numbers greater than twenty eight, the value of b is equal to one and for physical sector numbers less than twenty eight, the value of b is equal to zero. Therefore, the logical sector number LSN corresponding to the physical sector number 29, using the equation (5) is equal to twenty three, because the physical sector number 29 minus the skew, five, minus the value of bx, in this case one, is equal to twenty three. The logical sector number LSN corresponding to the physical sector number 2, using the equation (4) is equal to twenty eight, because the number of physical sectors on the track N, thirty two, plus the physical sector number 2, minus the skew, five, minus the value of bx, in this case one, is equal to twenty eight.

If the physical sector number is a defective sector which was slipped then the physical sector number is mapped to a logical sector number LSN using the equations (6) and (7), and adding the logical sector number of the last logical sector on the track X to the value bx. For the defective sector of FIG. 4 which has a physical sector number 28, it is assigned a logical sector number 31.

GENERAL DESCRIPTION OF THE METHODS OF TRANSLATION

Figure 14:
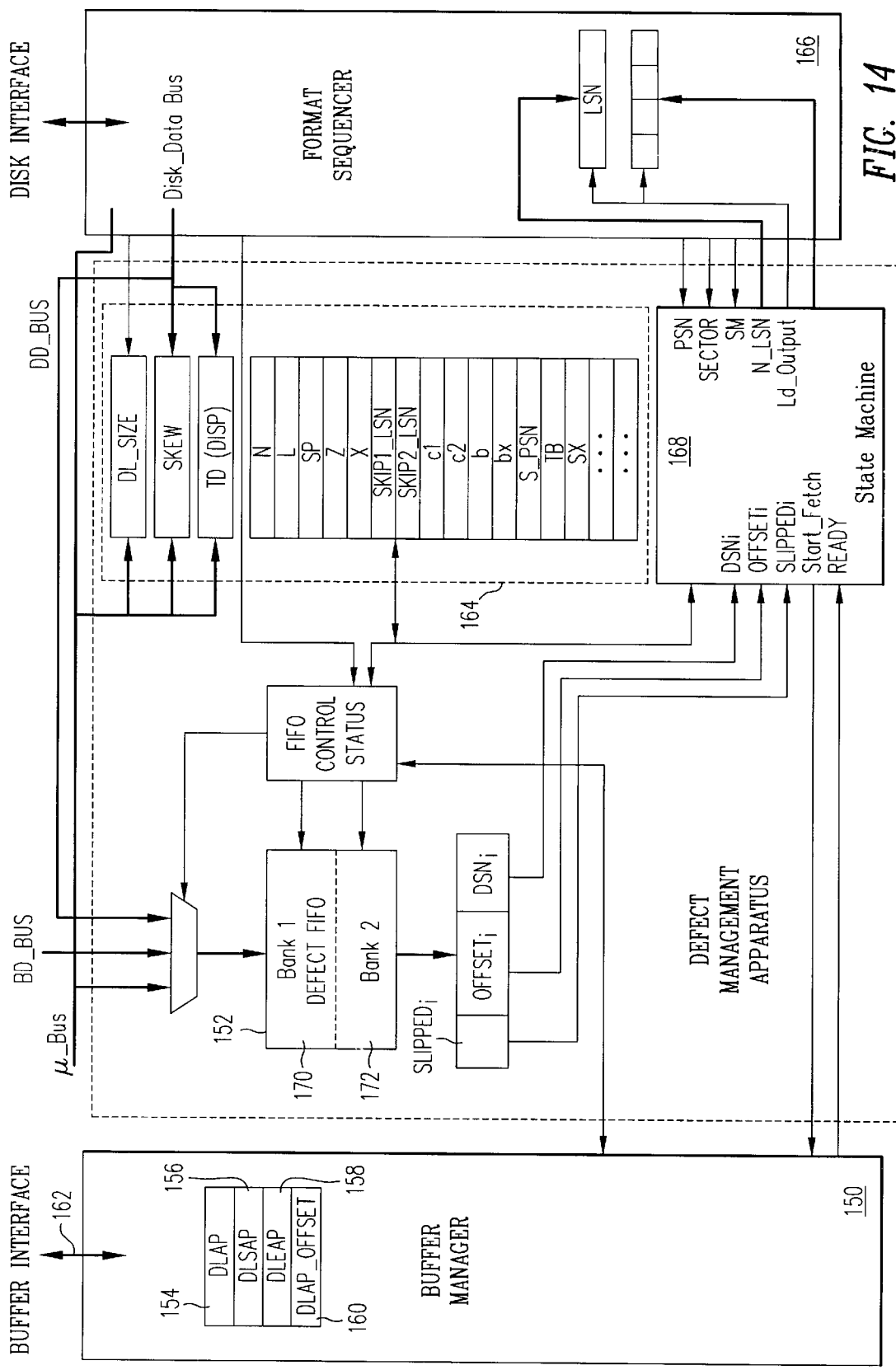
FIG. 14 illustrates a schematic block diagram of the apparatus of the present invention.

A schematic block diagram of the apparatus of the preferred embodiment of the present invention is illustrated in FIG. 14. The preferred embodiment of the method and apparatus of the present invention can use any one of three methods for translation of the physical sector number to a logical sector number for automatic track processing in disk drive systems. The first method builds a track defect table in the buffer RAM of the system. The buffer manager 150 uses the buffer interface 162 to control the retrieval of the defect records from the track defect table and load them into the defect FIFO. The track defect table includes a defect record for every defective sector on the track. The defect record includes a physical sector number of the defective sector DSN, an offset number and a flag bit indicating whether or not the defective sector is slipped.

This defect list includes a two-byte or four-byte entry for each defective sector on the track. This defect list must be contiguous and can be located in any 64 Kbyte segment of the buffer. A defect list start address pointer DLSAP is stored in the register 156 and points to the starting address of the defect list within the buffer RAM. A defect list end address pointer DLEAP is stored in the register 158 and points to the ending address of the defect list within the buffer RAM. A three-byte defect list address pointer DLAP is stored in the register 154 and points to the current entry in the defect list. When the lower sixteen bits of the pointer DLAP are equal to the ending address pointer DLEAP, the lower sixteen bits of the pointer DLAP is automatically reloaded with the starting address pointer DLSAP. The remaining eight bits of the defect list address pointer DLAP is a segment selector which selects a segment within the buffer RAM. The size of the defect list is specified by the parameter DL_SIZE.

Figure 12:
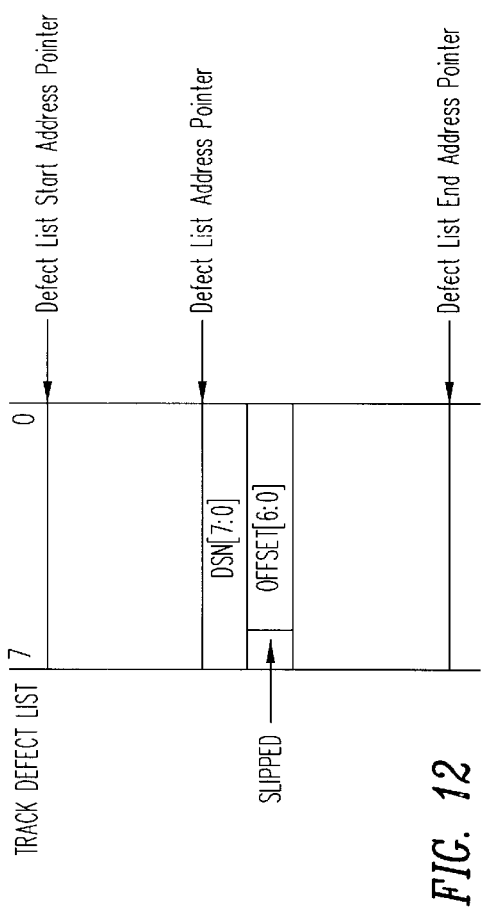
FIG. 12 illustrates a track defect list stored in the buffer RAM.

A track defect list is illustrated in FIG. 12. Each defective sector on the track has a corresponding entry in the defect list which includes an eight-bit defect sector number DSN, a seven bit offset value and a flag SLIPPED, wherein the flag SLIPPED is stored in the most significant bit of the second byte of the defect record. Alternatively, the defect sector number DSN could be a two-byte value and the offset value could be a fifteen-bit value, with the flag SLIPPED stored in the most significant bit of the second word of the defect record.

The second method embeds the defect information for the track within the header subfield of each sector. The defect information includes an ordered list of n defect records, based on an increasing defect sector number DSN. If a defect record is not used it is assigned a hexadecimal value of FF, indicating that it is not a valid defect record. To begin processing the defect information for a track it is only necessary to read a single header field on the track and load the track defect information into the FIFO 152.

When an ID_Less format is being used, the defect information for each track can be written into the header of each sector, directly on the track. This defect information, in the preferred embodiment of the present invention, includes an ordered list of four records, each record comprising a defect sector number DSN, which is the physical sector number of the defect, an associated offset value and a flag SLIPPED. The ordering of the list of four records is based on an increasing defect sector number DSN and as with the operation described above, a hexadecimal value of FF is not a valid defect sector number DSN.

The associated offset information is defined, and used for mapping the defective sectors to alternate sectors. Additionally, a FLAG byte is included in the header which contains a flag bit indicating that there are more than four defect records for this track. In the case when there are more than four defect records for the track, the system cannot process anything automatically and must use the microprocessor assisted method or store the defect list in the buffer RAM.

Figure 13:
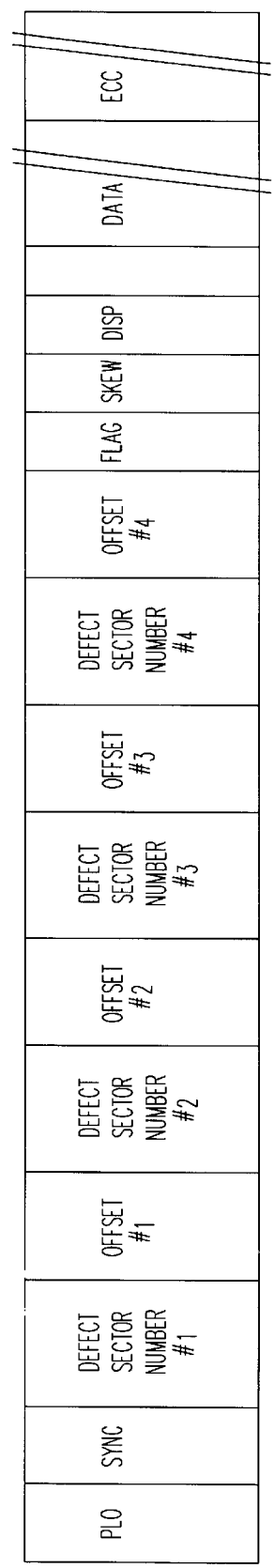
FIG. 13 illustrates a header sector for a system using an ID_LESS format, including four defect pairs.

The format of a sector with embedded defect information in the header is illustrated in FIG. 13. The sector comprises three subfields, including a header subfield, a DATA subfield and an ECC subfield. The header subfield contains a defect list of four defect records, a flag byte, optionally a displacement value, a skew value, a head number value and an error detecting CRC subfield. The programmable ECC subfield covering the header and DATA subfields also can be split to accommodate a servo mark in the preferred embodiment of the invention. Alternatively, the offset information could be removed from the header, and all defective sectors assumed to be slipped.

The third method includes the onboard first-in first-out stack FIFO 152 having a first bank BANK1 170 and a second bank BANK2 172 which are used as a ping-pong storage for the defect records. The microprocessor will fill the FIFO with track defect records if the number of defect records will fit in the FIFO. Otherwise, the microprocessor fills one of the banks while the other bank is being processed. Since the sector processing by the system will take more time than filling the FIFO, the microprocessor intervention time is negligible and if a reasonable sized FIFO is used, not time critical.

This information can be loaded into the FIFO by the microprocessor. The internal FIFO 152 consists of two banks which are used in a ping-pong manner. After the setup computation, if the number of defect records will not fit in the FIFO, the microprocessor loads both banks with defect information and the microprocessor sets both a flag BANK1_READY and a flag BANK2_READY to a logical high voltage level, loads other parameters and instructs the apparatus of the present invention that it can begin the operation.

Each bank within the FIFO 152 of the preferred embodiment can hold four entries from the defect list at any one time. To begin the automatic processing for the current track, the first four entries from the defect list for the track are loaded into the first bank. If there are more than four entries, the next four entries are loaded into the second bank. The microprocessor manages the loading of the banks but the computations are done by the hardware of the present invention. After the defect list in the first bank is processed, the flag BANK1_READY is reset to a logical low voltage level and an interrupt is sent to the microprocessor. When the microprocessor receives the interrupt, it initiates the load into the first bank if there are more than eight entries in the defect list for this track.

The microprocessor and the hardware of the present invention then continue this operation, processing the entries in one bank, while the other bank is being loaded, until the operation is completed.

DESCRIPTION OF THE ALGORITHM OF THE PRESENT INVENTION

Figure 6A:
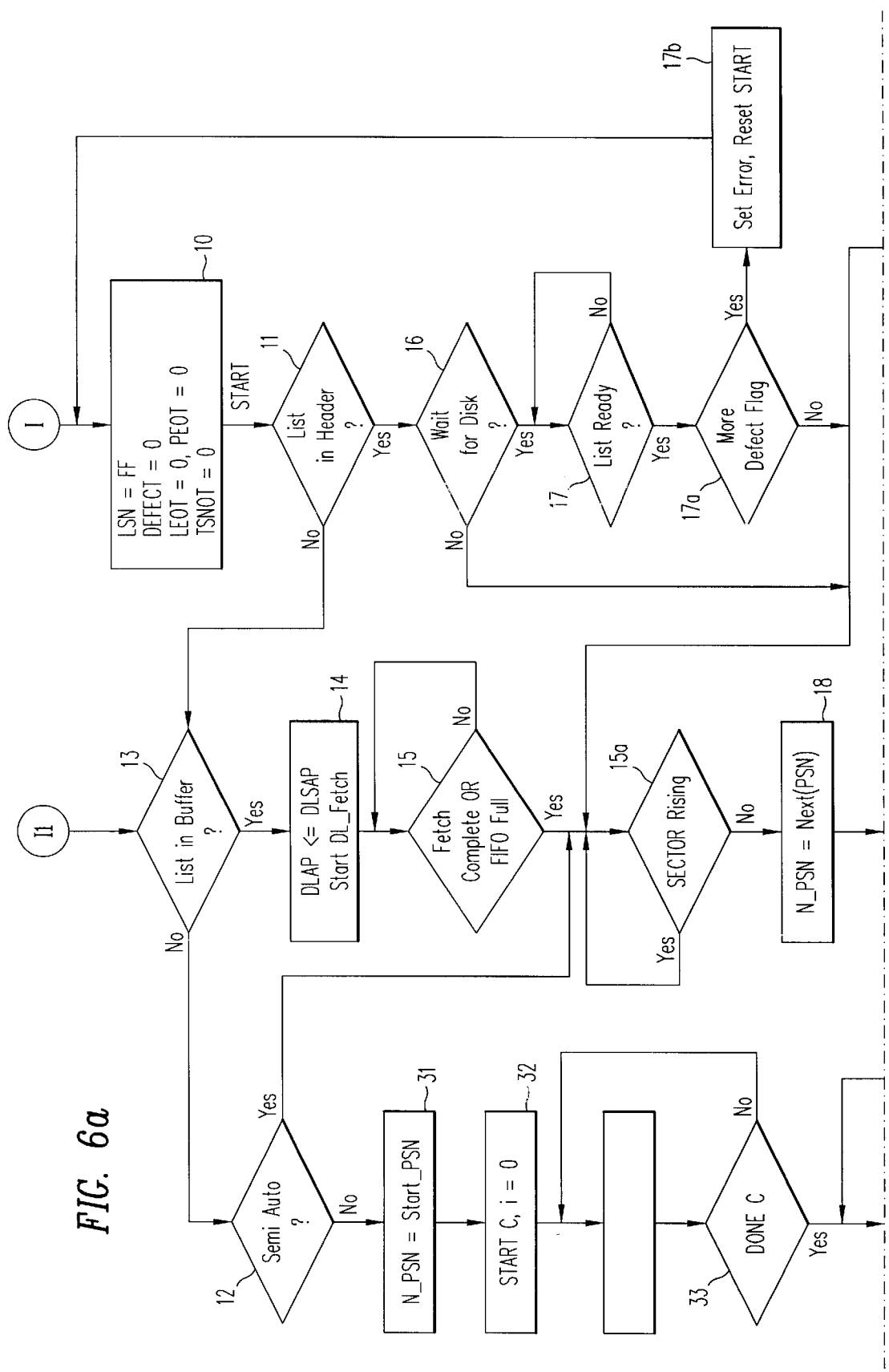
FIG. 6 illustrates a flow chart of the main program of the present invention.

A flow chart illustrating the method of the present invention is illustrated in FIG. 6. The default values for the registers and flags are set in the Block 10. The logical sector number LSN is set to a hexadecimal value of FF, the DEFECT flag, the logical end of track flag LEOT, the physical end of track flag PEOT and the target sector not on track flag TSNOT are all reset to a logical low voltage level. After the default values are set, the apparatus of the present invention then determines if the defect list is stored in the headers of the sectors at the Block 11. If the defect list is stored in the header then the apparatus of the present invention determines if it is to wait for the apparatus of the present invention to read the defect list from a header at the Block 16. If the apparatus of the present invention has already read the defect list from the header and has the defect list loaded, it then jumps to the Block 15a and begins processing the defect information for the track. If the apparatus of the present invention is to wait while the defect list is read and does not yet have the defect list loaded, then it waits at the Block 17 until the defect list is ready. Once the defect list is ready, the apparatus proceeds to the Block 17a where it determines if the more defect flag for the sector is set to a logical high voltage level signalling that the number of defects has exceeded the number of records available in the defect list. If the apparatus determines that the more defect flag is set to a logical high voltage level then an error is signalled and the signal START is reset to a logical low voltage level at the Block 17b and the apparatus returns to the Block 10 to begin the algorithm again. If the more defect flag is not set to a logical high voltage level then the apparatus jumps to the Block 15a.

If the defect list is not stored in the header of each sector on the track, the apparatus then determines at the Block 13 if the defect list is stored in the buffer RAM. If the defect list is stored in the buffer RAM then the defect list address pointer DLAP is initialized with the address of the defect list starting address pointer DLSAP and the apparatus is instructed to begin the fetch of the records from the defect list stored in the buffer RAM at the Block 14. At the Block 15, the apparatus waits until the fetch of the entries in the defect list is complete or until the FIFO is full whichever occurs first. Once the fetch of all of the entries in the defect list is complete or the FIFO is full the apparatus then determines at the Block 15a if a sector mark rising pulse is detected. A sector mark rising pulse is generated when the rising edge of a sector mark is detected. If no sector mark rising pulse is detected the apparatus jumps to the Block 18 and begins processing the defect information for the track.

If the defect information is not stored in the header of each sector or in the buffer RAM, the apparatus then determines at the Block 12 if the defect list fits completely in the defect FIFO and that the microprocessor has loaded the defect list in the defect FIFO. If the defect list does not fit completely in the defect FIFO, then the operation mode control, set by the microprocessor, indicates that the defect list does not fit completely in the defect FIFO and the microprocessor will manage loading a first bank BANK1 of registers and a second bank of registers BANK2. A starting physical sector number START_PSN is loaded into the internal physical sector number register N_PSN at the Block 31. At the Block 32, the defect FIFO pointer i is reset to zero and a command is given by the onboard logic to begin the subroutine C, illustrated in FIG. 9 and described in detail below. The apparatus then waits until the subroutine C is complete at the Block 33 and it has received an asserted signal DONE_C. After the apparatus completes the subroutine C, it then waits for a sector mark rising pulse at the Block 34. After the apparatus has detected a sector mark rising pulse, it then waits at the Block 36 until the physical sector number PSN is equal to the starting physical sector number START_PSN. As soon as the physical sector number PSN is equal to the starting physical sector number START_PSN, the apparatus determines at the Block 36a whether or not a stop command has been issued. If a stop command has not been issued the apparatus jumps to the Block 30, otherwise at the Block 37 an error condition flag is set to a logical high voltage level, the signal START is reset to a logical low voltage level and the apparatus jumps up to the Block 10.

If the apparatus determines at the Block 12 that the defect list fits completely in the defect FIFO and the microprocessor has loaded the defect list in the defect FIFO, it then jumps to the Block 15a to begin processing the defect information for the track. The apparatus determines at the Block 15a if a sector mark rising pulse is detected. If a sector mark rising pulse is detected the apparatus waits at the Block 15a until no sector mark rising pulse is detected and then proceeds to the Block 18. At the Block 18 the apparatus loads the next physical sector number NEXT(PSN) into the internal physical sector number register N_PSN. At the Block 19 the apparatus begins the subroutine A, illustrated in FIG. 7, which will be discussed in detail below. A blank box follows the Block 19 signalling that there is a delay after the Block 19. While the apparatus of the present invention is executing the subroutine A it also checks for a sector mark rising pulse at the Block 21. If a sector mark rising pulse is detected before the apparatus completes the subroutine A, the apparatus aborts the execution of the subroutine A at the Block 28 and then determines at the Block 28a if the defect list is stored in the buffer RAM. If the defect list is stored in the buffer RAM the apparatus jumps back to the Block 13, otherwise it jumps back up to the Block 15a. Also at the Block 28 the logical sector number LSN is set to a hexadecimal value of FF, the DEFECT flag, the logical end of track flag LEOT, the physical end of track flag PEOT and the target sector not on track flag TSNOT are all reset to a logical low voltage level. The apparatus waits at the Block 22 until the completion of the subroutine A, as long as no sector mark rising pulse is detected before the subroutine A is finished.

After the subroutine A is completed the apparatus then begins the subroutine C at the Block 23. While the apparatus is executing the subroutine C it also checks for a sector mark rising pulse at the Block 24. If a sector mark rising pulse is detected before the apparatus completes the subroutine C, the apparatus aborts the execution of the subroutine C at the Block 29 and jumps back up to the Block 28a. Also at the Block 29, the logical sector number LSN is set to a hexadecimal value of FF, and the DEFECT flag, the logical end of track flag LEOT, the physical end of track flag PEOT and the target sector not on track flag TSNOT are all reset to a logical low voltage level. The apparatus waits at the Block 25 until the completion of the subroutine C, as long as no sector mark rising pulse is detected before the subroutine C is finished.

After the completion of the subroutine C, the apparatus of the present invention determines at the Block 26 if it is to stop processing the defect information for this track. If the apparatus is to stop processing the defect information for this track, then an error condition flag is set to a logical high voltage level at the Block 37, the signal START is reset to a logical low voltage level and the apparatus jumps back up to the Block 10. If the apparatus determines that it is not to stop processing the defect information for this track, then it waits at the Block 27 for a sector mark rising pulse. After the apparatus has detected a sector mark rising pulse, it then completes the instructions at the Block 30 and jumps to the Block 23 and begins the subroutine C for the next sector.

At the Block 30, the next physical sector number NEXT (PSN) is loaded into the internal physical sector number register N_PSN, the value from the internal logical sector number register N_LSN is loaded into the logical sector number register LSN, the value of the internal defect flag N_DEFECT is stored in the defect flag DEFECT, the value of the internal logical end of track flag N_LEOT is stored in the logical end of track flag LEOT, the value of the internal physical end of track flag N_PEOT is stored in the physical end of track flag PEOT and the internal target sector not on track flag N_TSNOT is stored in the target sector not on track flag TSNOT for processing by the Format Sequencer 166. The apparatus of the present invention always performs the calculations for the sector ahead of where the apparatus actually is on the disk. The results of these calculations are stored in the internal registers and flags denoted by an N before them and when a sector mark rising pulse is detected, the values of the internal registers and flags are loaded into the apparatus registers and flags for that sector and the apparatus then begins performing the calculations for the next sector, always one ahead of its actual position.

DESCRIPTION OF SUBROUTINE A

Figure 7A:
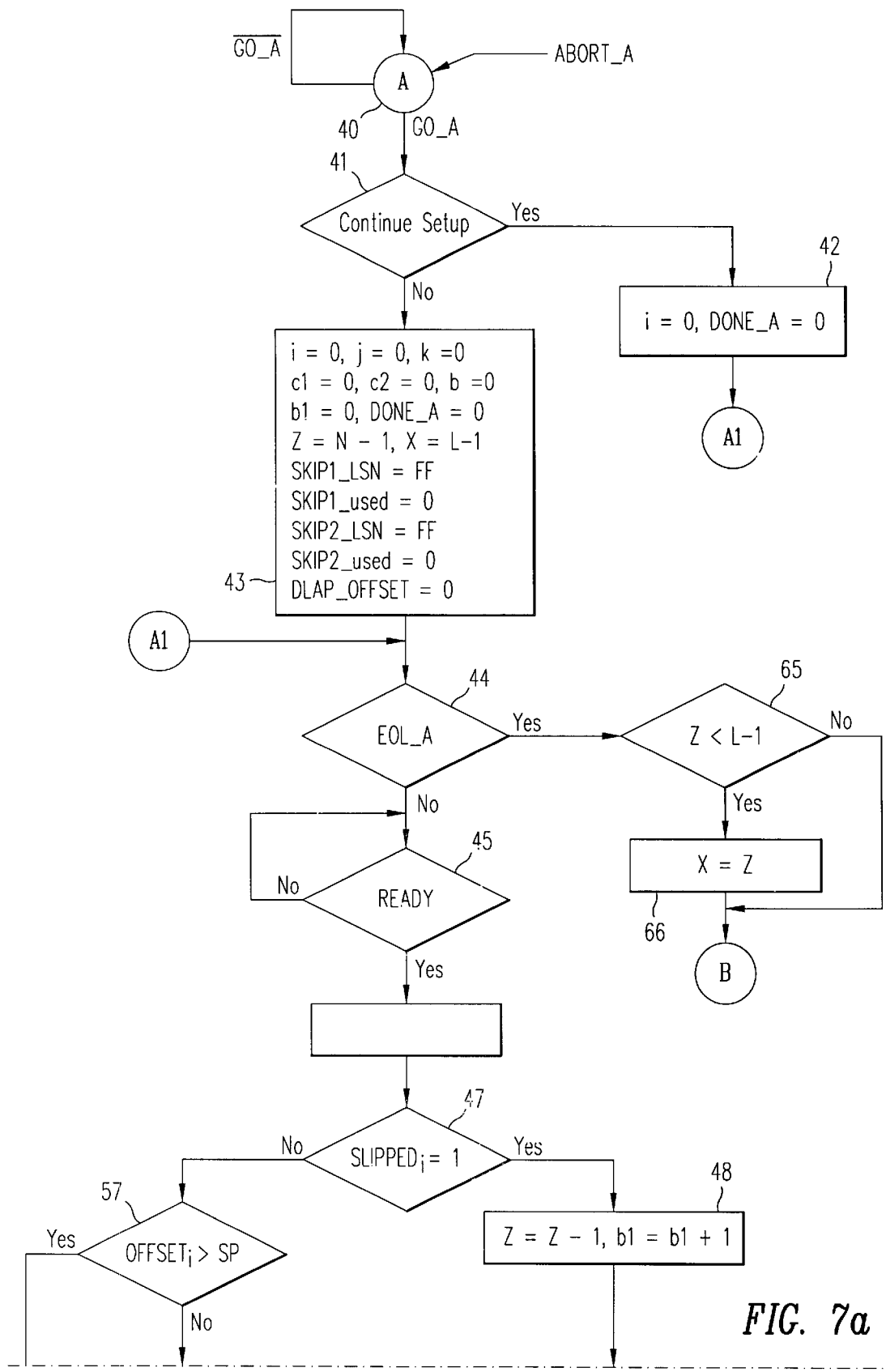
FIG. 7 illustrates a flow chart of the subroutine A of the present invention.
Figure 7B:
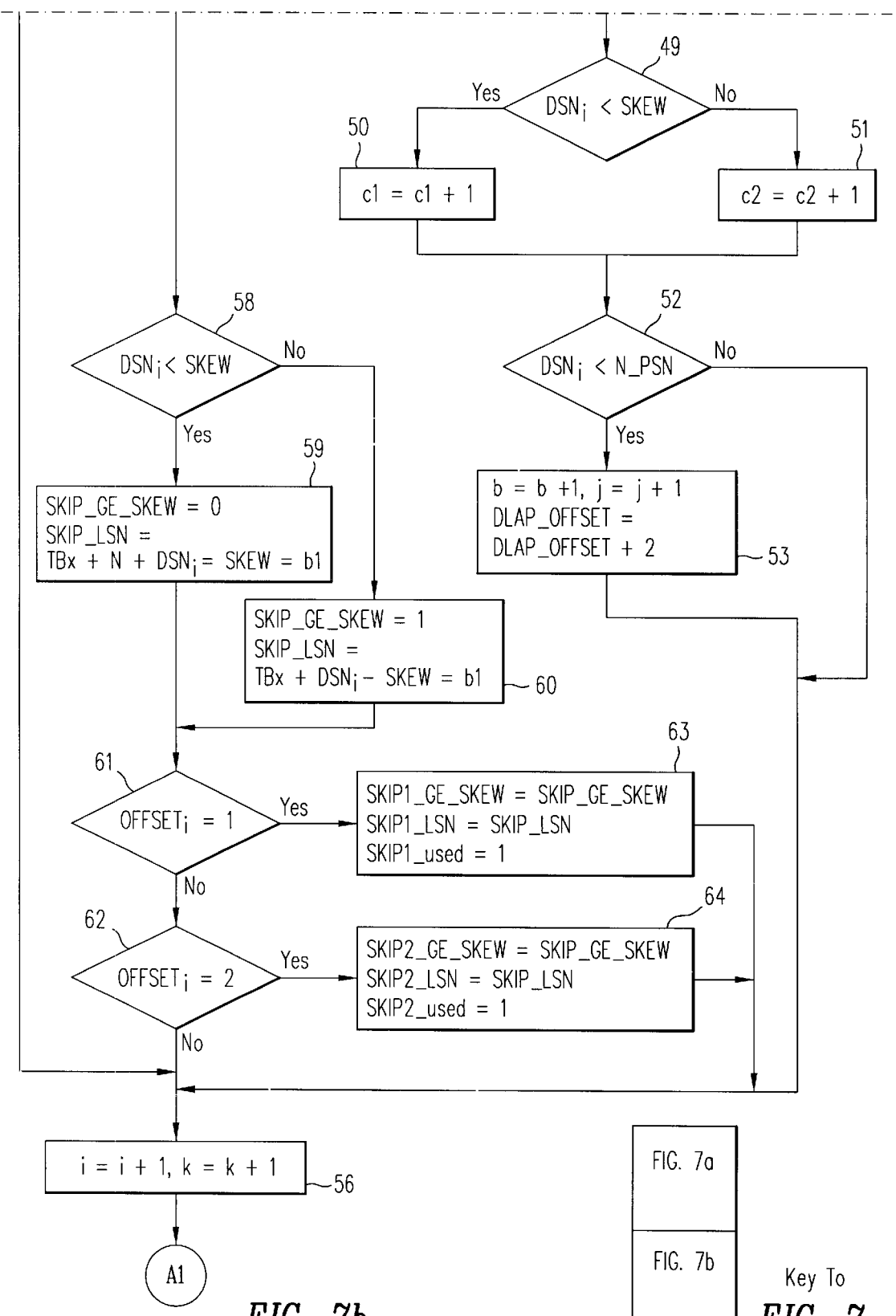
Figure 7:
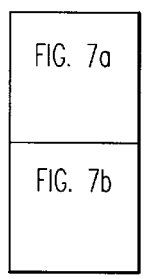

The subroutine A, illustrated in FIG. 7, scans the track defect information and computes the number of defective sectors on the track that are slipped (c1, c2, b, b1), the logical sector number of the last logical sector on the track X, the logical sector number of the last good sector on the track Z and the logical sector number of the defective sectors on the track that are skipped and mapped to the spare sectors on the track SKIP1_LSN and SKIP2_LSN, the defective list address pointer offset DLAP_offset and the pointer K. A hexadecimal value of FF for the logical sector number of the defective sectors on the track that are skipped and mapped to the spare sectors on the track SKIP1_LSN and SKIP2_LSN indicates that there is not a defective sector on the track that was skipped and mapped to the spare sector on the track, but does not indicate that the spare sectors on the track were not used, because defective sectors from other tracks could have been mapped to the spare sectors on the track.

The subroutine A begins at the Block 40 where the apparatus of the present invention waits until a start subroutine A signal GO_A is asserted. If an abort signal ABORT_A was issued by the apparatus due to the detection of a sector mark rising pulse prior to the completion of the subroutine A as described above, then the subroutine A is aborted and the apparatus returns to the Block 40 and waits for the next assertion of the signal GO_A, which signals to begin the subroutine A. The subroutine A can be started by the microprocessor for the setup computation, using two modes of operation Start_Setup and Continue_Setup. During the setup, the microprocessor initializes the parameters, loads the defect FIFO and starts the setup computation by setting the signal Start_Setup to a logical high voltage level and waiting for the signal DONE_A to be set to a logical high voltage level, indicating the completion of the setup. If the defect list was not completely processed, because it was larger than the size of the FIFO, then the microprocessor will load the defect FIFO with subsequent defect records and would continue the setup computation by setting the signal Continue_Setup to a logical high voltage level and waiting for the signal DONE_A to be set to a logical high voltage level, the microprocessor will then repeat the continue setup operation until the defect list is completely processed. The signal GO_A is the result of a logical OR operation of the signals START_A, Start_Setup and Continue_Setup. At the Block 41 the apparatus determines if a continue setup signal has been asserted. If a continue setup signal has been asserted, then the instructions at the Block 42 are completed and the apparatus initialized to continue setup. At the Block 42, the defect FIFO pointer i is set to zero and the DONE_A flag is reset to a logical low voltage level. After executing the instructions at the Block 42, the apparatus then jumps to the point A1 in the subroutine which begins at the Block 44.

If the apparatus of the present invention determines at the Block 41 that a continue setup signal has not been asserted, then the instructions at the Block 43 are completed. At the Block 43, the defect FIFO pointer i, the defect FIFO pointer j that points to the last record in the FIFO which has a defective sector number less than the next physical sector number N_PSN, the number of defect records processed in the track defect list k, the number of slipped defective sectors c1, the number of slipped defective sectors c2, the number of slipped defective sectors b, the number of slipped defective sectors b1 and the flag DONE_A are all reset to zero. Also at the Block 43, the logical sector number of the last good sector on the track Z is set equal to the number of physical sectors on the track N minus one, the logical sector number of the last logical sector on the track X is set equal to the number of logical sectors per track L minus one, the logical sector numbers of the defective sectors on the track that are skipped and mapped to the first and second spare sectors on the track SKIP1_LSN and SKIP2_LSN are set equal to a hexadecimal value of FF, the first and second spare sector used flags SKIP1_USED and SKIP2_USED are reset to a logical low voltage level and the defect list address pointer offset value DLAP_OFFSET is set equal to zero.

At the Block 44 the apparatus of the present invention determines if the end of list flag EOL_A is set to a logical high voltage level, signalling that all of the defect records in the defect FIFO have been processed. If the end of list flag EOL_A is set to a logical high voltage level then the apparatus determines at the Block 65, if the logical sector number of the last good sector on the track Z is less than the number of logical sectors per track L minus one. If the logical sector number of the last good sector on the track Z is less than the number of logical sectors per track L minus one, the apparatus then stores the logical sector number of the last good sector on the track Z into the logical sector number of the last logical sector on the track X and jumps to the beginning of the subroutine B, illustrated in FIG. 8, which will be discussed in detail below. Otherwise, the apparatus skips the Block 66 and jumps to the subroutine B.

If, at the Block 44, the apparatus of the present invention determines that the end of list flag EOL_A is not set to a logical high voltage level, then the apparatus waits at the Block 45 until the next record is in the FIFO and the system is ready The system is always ready except when the defect list is in the buffer, in which case the signal from the buffer manager is asserted to indicate that the next defect record has already been fetched and is in the FIFO. After the next record is in the FIFO and the system is ready, the apparatus of the present invention then determines at the Block 47 if the slipped flag of the record SLIPPEDi is set at a logical high voltage level, indicating that the defective sector is slipped. If the defective sector is slipped then the apparatus decrements the logical sector number of the last good sector Z at the Block 48. Also at the Block 48 the number of slipped defective sectors b1 is incremented. At the Block 49 the apparatus determines if the defect sector number for the record DSNi is less than the skew value for the apparatus SKEW. If the defect sector number for the record DSNi is not less than the skew value for the disk drive system SKEW then the number of slipped defective sectors c2 is incremented at the Block 51, otherwise the number of slipped defective sectors c1 is incremented at the Block 50. After one of the defect sector numbers c1 or c2 has been incremented, the apparatus then determines at the Block 52 if the defect sector number for the record DSNi is less than the value stored in the internal physical sector number register N_PSN. If the defect sector number for the record DSNi is less than the value stored in the internal physical sector number register N_PSN, then at the Block 53 the increments the number of slipped defective sectors b and the defect FIFO pointer j and also adds the defect record length, a value of two, to the defect list address pointer offset DLAP_OFFSET and then jumps to the Block 56, otherwise the apparatus skips the Block 53 and jumps to the Block 56.

If the apparatus of the present invention determines at the Block 47 that the slipped flag for this record SLIPPEDi is not set to a logical high voltage level, then the apparatus determines at the Block 57 if the offset value for this record OFFSETi is greater than the number of spare sectors per track SP. If the offset value for this record OFFSETi is greater than the number of spare sectors per track SP, then the apparatus jumps to the Block 56. If the offset value for this record OFFSETi is not greater than the number of spare sectors per track SP, then the apparatus determines at the Block 58 if the defect sector number for this record DSNi is less than the skew value for the system SKEW. If the defect sector number for this record DSNi is less than the skew value for the system SKEW then at the Block 59, the skip skew flag SKIP_GE_SKEW is reset to a logical low voltage level and the skip logical sector number value SKIP_LSN is computed by adding the value TBx to the number of physical sectors per track N, then adding the defect sector number DSNi to the result and subtracting the skew of the system SKEW and the number of slipped defective sectors b1. The value TBx is equal to the track base TB minus the track displacement TD. The track base TB is equal to the logical sector number of the first logical sector on the track within a segment and the track displacement TD indicates the number of sectors slipped in the previous tracks of the segment. If the defect sector number for this record DSNi is not less than the skew value for the system SKEW, then the instructions at the Block 60 are executed, and the skip skew flag SKIP_GE_SKEW is set to a logical high voltage level and the skip logical sector number value SKIP_LSN is computed by adding the value TBx to the defect sector number DSN and subtracting the skew of the system SKEW and the number of slipped defective sectors b1.

After the apparatus of the present invention has performed the calculations at the Block 59 or the Block 60, it then determines at the Block 61 if the offset value for the record OFFSETi is equal to one. If the offset value for the record OFFSETi is equal to one, then at the Block 63 the value in the skip skew flag SKIP_GE_SKEW is loaded in the first skip skew flag SKIP1_GE_SKEW, the skip logical sector number value SKIP_LSN is loaded in the first skip logical sector number SKIP1_LSN and the first spare sector used flag SKIP1_USED is set to a logical high voltage level. If the offset value for the record OFFSETi is not equal to one then the apparatus determines at the Block 62 if the offset value for the record OFFSETi is equal to two. If the offset value for the record OFFSETi is equal to two then at the Block 64 the value in the skip skew flag SKIP_GE_SKEW is loaded in the second skip skew flag SKIP2_GE_SKEW, the skip logical sector number value SKIP_LSN is loaded in the second skip logical sector number SKIP2_LSN and the second spare sector used flag SKIP2_USED is set to a logical high voltage level.

After the instructions have been executed at either of the Blocks 63 or 64 or if the offset value for the record OFFSETi is not equal to one or two then the instructions at the Block 56 are executed and the defect FIFO pointer i and the number of defect records processed in the track defect list k are incremented. After the instructions are executed at the Block 56 the apparatus jumps back up to the point A1, beginning at the Block 44, and performs the calculations for the next defect record in the defect list.

DESCRIPTION OF SUBROUTINE B

Figure 8A:
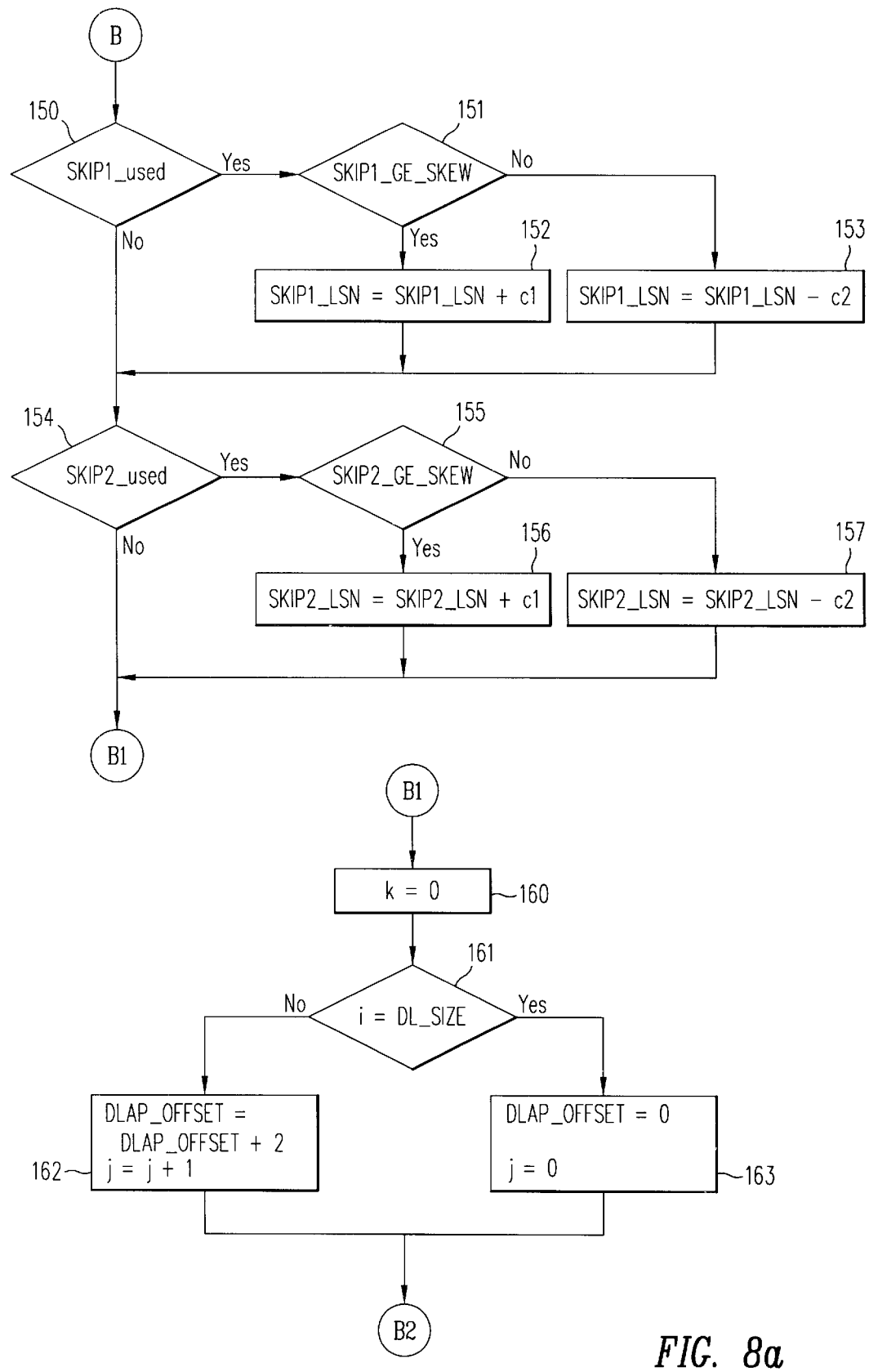
FIG. 8 illustrates a flow chart of the subroutine B of the present invention.
Figures 8, 8A, 8B:
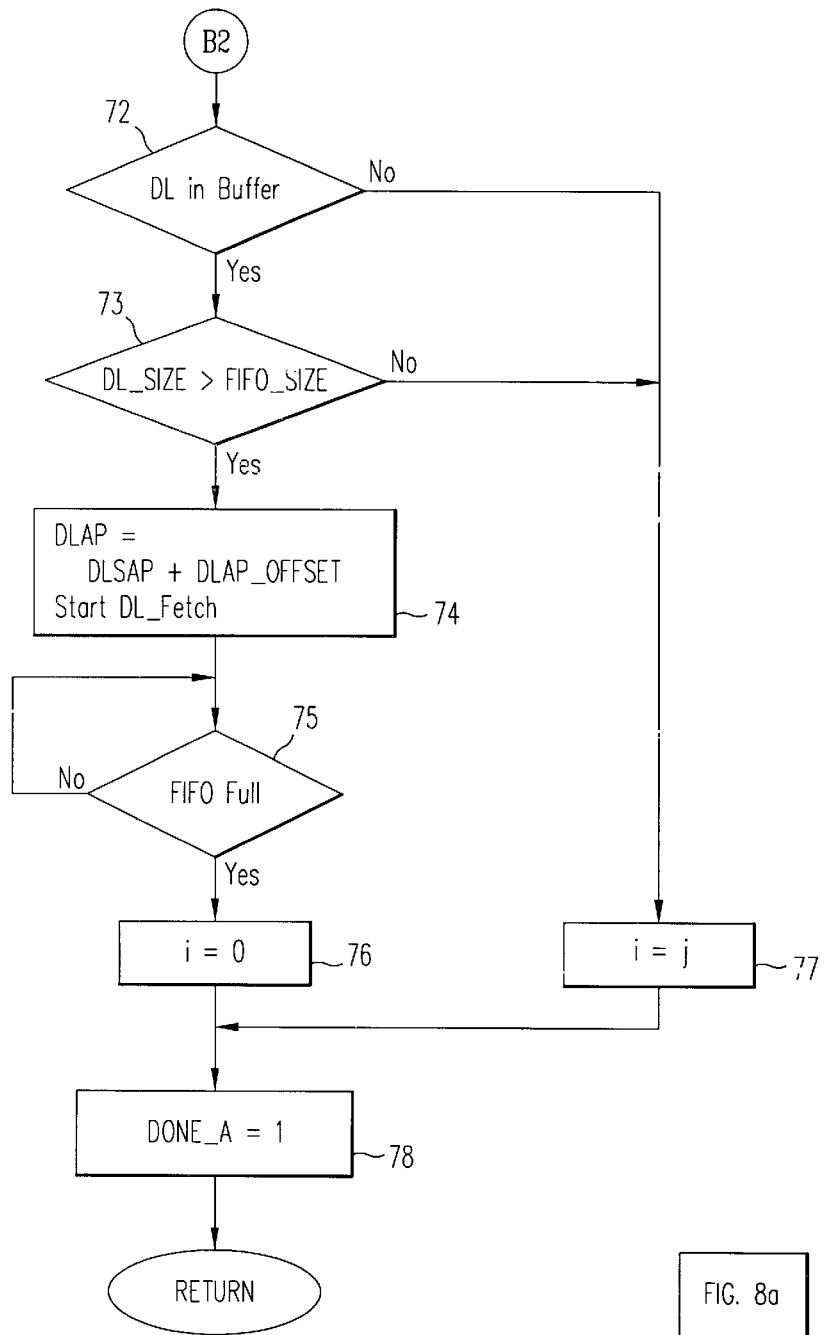

The subroutine B is illustrated in FIG. 8 and begins at the Block 150 where it is determined if the first spare sector used flag SKIP1_USED has been set to a logical high voltage level. If the first spare sector used flag SKIP1_USED has not been set to a logical high voltage level then the apparatus jumps to the Block 154. If the first spare sector used flag SKIP1_USED has been set to a logical high voltage level, then at the Block 151 it is determined if the first skip skew flag SKIP1_GE_SKEW is set to a logical high voltage level. If the first skip skew flag SKIP1_GE_SKEW is set to a logical high voltage level, then at the Block 152 the first skip logical sector number SKIP1_LSN is added to the number of slipped defective sectors c1 and the result is stored in the first skip logical sector number SKIP1_LSN, otherwise, at the Block 153, the number of slipped defective sectors c2 is subtracted from the skip logical sector number SKIP1_LSN and the result is stored in the first skip logical sector number SKIP1_LSN. After the instructions in either the Block 152 or the Block 153 have been executed, then the apparatus jumps to the Block 154.

At the Block 154, the apparatus of the present invention determines if the second spare sector used flag SKIP2_USED has been set to a logical high voltage level. If the second spare sector used flag SKIP2_USED has not been set to a logical high voltage level then the apparatus jumps to the point B1, which begins at the Block 160. If the second spare sector used flag SKIP2_USED has been set to a logical high voltage level, then at the Block 155 it is determined if the second skip skew flag SKIP2_GE_SKEW is set to a logical high voltage level. If the second skip skew flag SKIP2_GE_SKEW is set to a logical high voltage level, then at the Block 156 the second skip logical sector number SKIP2_LSN is added to the number of slipped defective sectors c1 and the result is stored in the second skip logical sector number SKIP2_LSN, otherwise, at the Block 157, the number of slipped defective sectors c2 is subtracted from the skip logical sector number SKIP2_LSN and the result is stored in the second skip logical sector number SKIP2_LSN. After the instructions in either the Block 156 or the Block 157 have been executed, the apparatus then jumps to the point B1 which begins at the Block 160.

At the Block 160, the number of defect records processed in the track defect list k is set equal to zero. The apparatus then determines at the Block 161 whether the defect FIFO pointer j is equal to the size of the defect list DL_SIZE. If the defect FIFO pointer j is not equal to the size of the defect list DL_SIZE, then at the Block 162, the defect pointer j is incremented by one, the defect list address pointer offset DLAP_OFFSET is increased by two, the size of record in the defect list. From the Block 162 the apparatus then jumps to the point B2 in the subroutine, beginning at the Block 72. If the defect FIFO pointer j is equal to the size of the defect list DL_SIZE, then at the Block 163 both the defect pointer j and the defect list address pointer offset DLAP_OFFSET are reset to zero. The apparatus then jumps from the Block 163 to the point B2 and begins executing the instructions at the Block 72.

The apparatus of the present invention determines at the Block 72 whether the defect list is in the buffer RAM. If the defect list is not in the buffer RAM then the apparatus jumps to the Block 77, otherwise the apparatus then determines at the Block 73 if the size of the defect list DL_SIZE is greater than the size of the FIFO. If the size of the defect list DL_SIZE is not greater than the size of the FIFO, then the apparatus jumps to the Block 77, otherwise, the instructions at the Block 74 are executed. At the Block 77 the defect FIFO pointer i is loaded with the value of the defect FIFO pointer j and the apparatus jumps to the Block 78. At the Block 74, the defect list starting address pointer value DLSAP is added to the defect list address pointer offset DLAP_OFFSET and the result is stored in the defect list address pointer DLAP. Also at the Block 74 the apparatus initiates the fetch of the next record in the defect list.

At the Block 75 the apparatus of the present invention waits until the FIFO is full. Once the FIFO is full, at the Block 76, the apparatus resets the defect FIFO pointer i to zero. At the Block 78, the flag DONE_A is set to a logical high voltage level and the apparatus returns to the main program, after the Block 19, where the apparatus jumped to the subroutine A.

DESCRIPTION OF SUBROUTINE C

Figure 9:
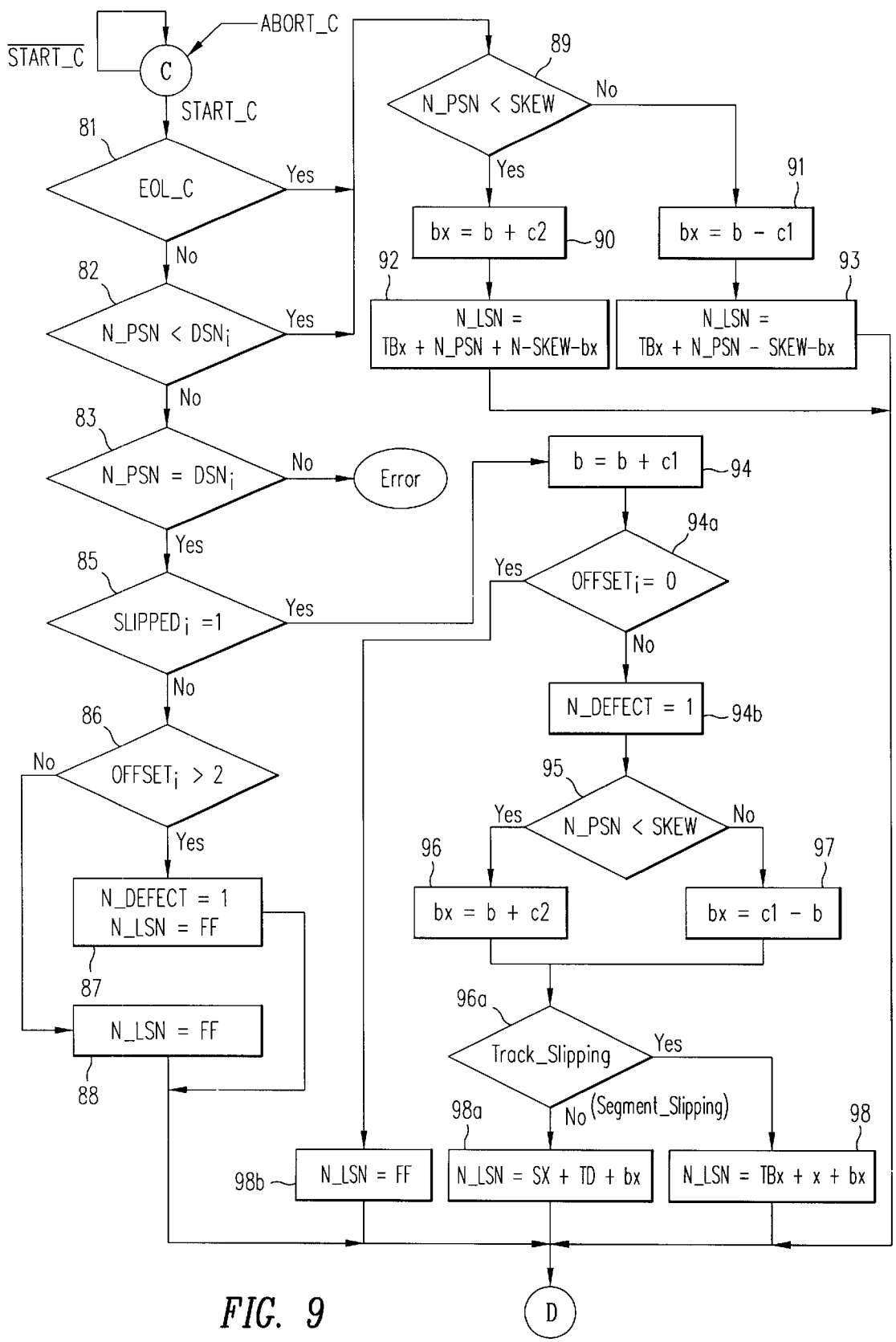
FIG. 9 illustrates a flow chart of the subroutine C of the present invention.

The subroutine C, illustrated in FIG. 9, begins at the Block 80 and performs the computations for physical to logical mapping. The apparatus of the present invention waits at the Block 80 until a start subroutine C signal START_C is asserted, indicating that the apparatus is ready for the subroutine C to begin. The apparatus can also issue an abort subroutine C signal at the Block 80 if a sector mark rising pulse is detected before the subroutine C is completed, as described above. After the signal START_C is asserted, the apparatus next determines at the Block 81 if the end of list flag EOL_C is set to a logical high voltage level. If the end of list flag EOL_C is set to a logical high voltage level then it is determined at the Block 89 if the value stored in the internal physical sector number register N_PSN is less than the skew value for the system SKEW. If the value stored in the internal physical sector number register N_PSN is less than the skew value for the system SKEW then the number of slipped defective sectors bx is equal to the number of slipped defective sectors b plus the number of slipped defective sectors c2 at the Block 90 and the total of the value TBx, the value of the internal physical sector number register N_PSN and the number of physical sectors per track N minus the skew value of the system SKEW and the number of slipped defective sectors bx is stored in the internal logical sector number register N_LSN at the Block 92.

If the apparatus of the present invention determines at the Block 89 that the value stored in the internal physical sector number register N_PSN is not less than the skew value for the system SKEW, then the number of slipped defective sectors bx is equal to the number of slipped defective sectors b minus the number of slipped defective sectors c1 at the Block 91 and the total of the value TBx plus the value of the internal physical sector number register N_PSN minus the skew value of the system SKEW and the number of slipped defective sectors bx is stored in the internal logical sector number register N_LSN at the Block 93. After the instructions are executed at either of the Blocks 92 or 93, the apparatus then jumps to the beginning of the subroutine D, illustrated in FIG. 10, which begins at the Block 101.

If it is determined at the Block 81 that the end of list flag EOL_C is not set at a logical high voltage level, then the apparatus determines at the Block 82 if the next physical sector number N_PSN is less than the defect sector number of the record DSNi. If the next physical sector number N_PSN is less than the defect sector number of the record DSNi the apparatus executes the instructions in the Blocks 89–93 as described above. If the next physical sector number N_PSN is not less than the defect sector number of the record DSNi then the apparatus next determines at the Block 83 if the next physical sector number N_PSN is equal to the defect sector number of the record DSNi. If the next physical sector number N_PSN is not equal to the defect sector number of the record DSNi then an error is signalled and the apparatus jumps to the Block 134 in the subroutine E and issues a stop command.

If it is determined at the Block 83 that the next physical sector number N_PSN is equal to the defect sector number of the record DSNi then at the Block 85, it is determined if the slipped flag for the record SLIPPEDi is equal to a logical high voltage level. If the slipped flag for the record SLIPPEDi is equal to a logical high voltage level then the number of slipped defective sectors b is incremented at the Block 94 and the apparatus determines at the Block 94a whether or not the offset value OFFSETi is equal to zero. If the offset value OFFSETi is equal to zero then the apparatus jumps to the Block 98b where the next logical sector number value N_LSN is set equal to the hexadecimal value FF. If the offset value OFFSETi is not equal to zero then at the Block 94b the next defect flag N_DEFECT is set equal to a logical high voltage level and the apparatus determines at the Block 95 if the next physical sector number N_PSN is less than the skew of the system SKEW. If the next physical sector number N_PSN is less than the skew of the system SKEW then the number of slipped defective sectors bx is set equal to the number of slipped defective sectors b plus the number of slipped defective sectors c2 at the Block 96, otherwise the number of slipped defective sectors bx is set equal to the number of slipped defective sectors c1 minus the number of slipped defective sectors b at the Block 97. After the instructions are executed at either the Block 96 or the Block 97 the apparatus determines at the Block 96a if the system is using a track slipping method. If the system is using a track slipping method then the value TBx is added to the logical sector number of the last logical sector on the track X and the number of slipped defective sectors bx and the result stored in the next logical sector number register N_LSN at the Block 98. If the system is not using a track slipping method then the value SX is added to the track displacement value TD and the number of slipped defective sectors bx and the result is stored in the next logical sector number register N_LSN at the Block 98a. The value SX represents the last good logical sector of the track or segment. From the Blocks 98, 98a and 98b the apparatus jumps to the Block 119 where the defect FIFO pointer i and the number of defect records processed in the track defect list k are incremented. From the Block 119 the apparatus jumps to the beginning of the subroutine D.

If the slipped flag for the record SLIPPEDi is not equal to a logical high voltage level then it is determined at the Block 86 if the offset value OFFSETi is greater than the number of skip values included in the apparatus of the present invention. In the preferred embodiment of the present invention, two skip values are used SKIP1 and SKIP2. In alternate embodiments a different number of skip values could be used. Therefore, at the Block 86, if the offset value OFFSETi is greater than two, then the internal defect flag N_DEFECT is set to a logical high voltage level and the next logical sector number N_LSN is set to the hexadecimal value FF at the Block 87, otherwise only the next logical sector number N_LSN is set to the hexadecimal value FF at the Block 88. After the instructions are executed at either of the Blocks 87 or 88 the apparatus then jumps to the Block 119 where the defect FIFO pointer i and the number of defect records processed in the track defect list k are incremented. From the Block 119 the apparatus jumps to the beginning of the subroutine D.

DESCRIPTION OF THE SUBROUTINE D

Figure 10:
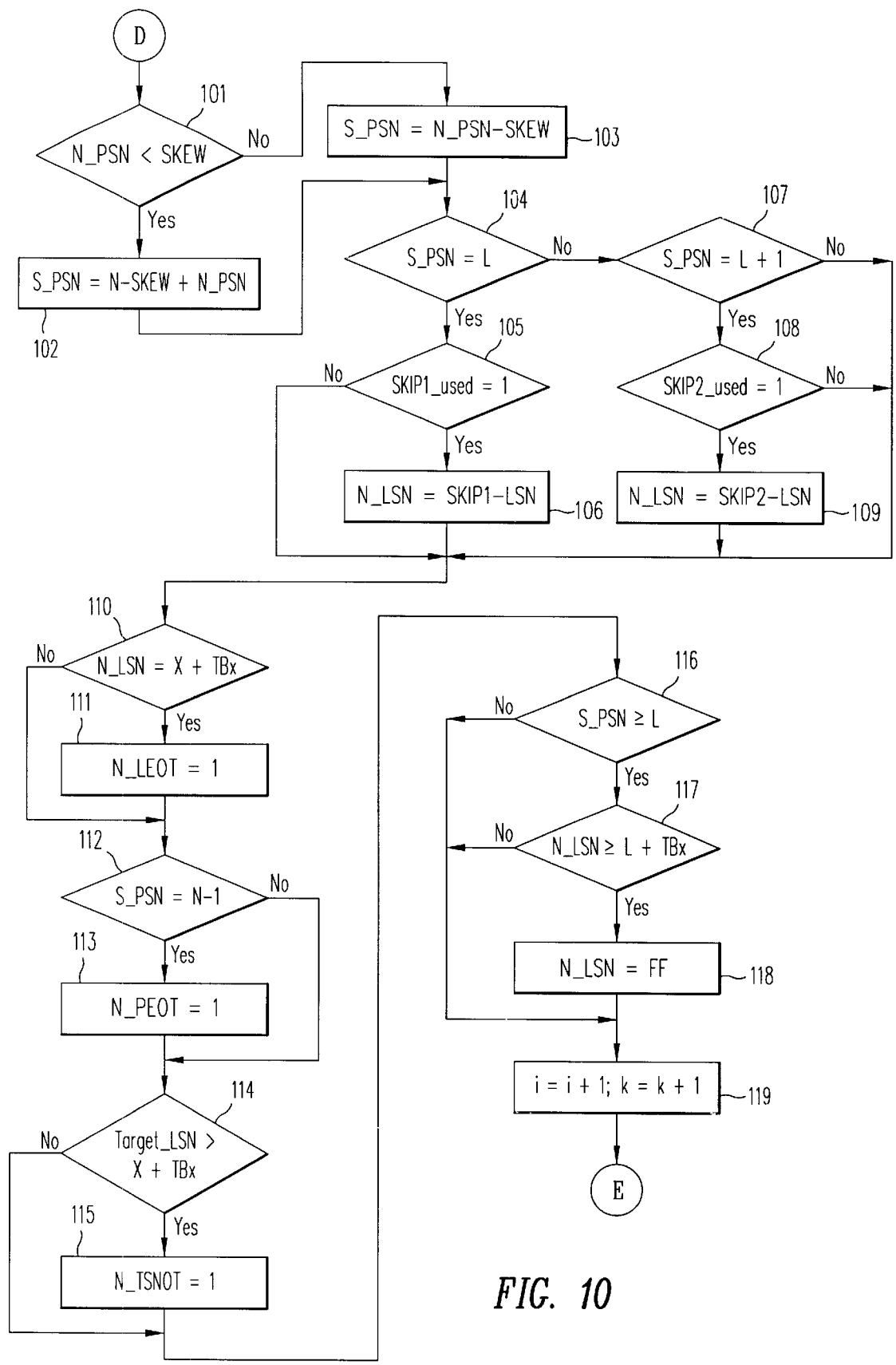
FIG. 10 illustrates a flow chart of the subroutine D of the present invention.

The subroutine D, illustrated in FIG. 10, determines if the physical sector number is a spare alternate sector and maps the physical sector number. The subroutine D begins at the Block 101 and determines if the value stored in the internal physical sector number register N_PSN is less than the skew value of the system. If the value stored in the internal physical sector number register N_PSN is not less than the skew value of the system, then at the Block 103, the apparatus of the present invention subtracts the skew value of the system from the value stored in the internal physical sector number register N_PSN and loads the result in the skew adjusted physical sector number register S_PSN. Otherwise, if the value stored in the internal physical sector number register N_PSN is less than the skew value of the system, at the Block 102, the apparatus adds the value stored in the internal physical sector number register N_PSN to the number of sectors for the physical track minus the skew value of the system and loads the result in the skew adjusted physical sector number register S_PSN.

After either the instructions at the Block 102 or at the Block 103 are executed, the apparatus of the present invention next determines at the Block 104 if the value stored in the skew adjusted physical sector number register S_PSN is equal to the number of logical sectors per track L. If the value stored in the skew adjusted physical sector number register S_PSN is not equal to the number of logical sectors per track L then the apparatus determines at the Block 107 if the value stored in the skew adjusted physical sector number register S_PSN is equal to the number of logical sectors per track L plus one. If the value stored in the skew adjusted physical sector number register S_PSN is not equal to the number of logical sectors per track L plus one, then the apparatus jumps directly to the Block 110. If it is determined at the Block 107 that the value stored in the skew adjusted physical sector number register S_PSN is equal to the number of logical sectors per track L plus one, then the apparatus determines at the Block 108 if the skip used flag SKIP2_USED is equal to a logical high voltage level. If the skip used flag SKIP2_USED is equal to a logical high voltage level then the value SKIP2_LSN is loaded in the internal logical sector number register N_LSN at the Block 109 and the apparatus jumps to the Block 110, otherwise the apparatus jumps directly to the Block 110.

If the value stored in the skew adjusted physical sector number S_PSN is equal to the number of logical sectors per track L, then the apparatus of the present invention determines at the Block 105 if the skip used flag SKIP1_USED is equal to a logical high voltage level. If the skip used flag SKIP1_USED is equal to a logical high voltage level then the value SKIP1_LSN is loaded in the internal logical sector number register N_LSN at the Block 106 and the apparatus jumps to the Block 110, otherwise the apparatus jumps directly to the Block 110.

At the Block 110 it is determined if the value in the internal logical sector number register N_LSN is equal to the logical sector number of the last logical sector on the track X plus the track base value TBx. If the value in the internal logical sector number register N_LSN is equal to the logical sector number of the last logical sector on the track X plus the track base value TBx then the value in the internal logical end of track register N_LEOT is set to a logical high voltage level at the Block 111 and the apparatus jumps to the Block 112, otherwise the apparatus skips the Block 111 and jumps directly to the Block 112. At the Block 112 it is determined if the value stored in the skew adjusted physical sector number register S_PSN is equal to the number of physical sectors on the track N minus one. If the value stored in the skew adjusted physical sector number register S_PSN is equal to the number of physical sectors on the track N minus one, then at the Block 113 the value in the internal physical end of track register N_PEOT is set to a logical high voltage level and the apparatus jumps to the Block 114, otherwise the apparatus skips the Block 113 and jumps directly to the Block 114.

At the Block 114, the apparatus of the present invention determines if the target logical sector number TARGET_LSN is greater than the sum of the logical sector number of the last logical sector on the track X plus the track base value TBx. If the target logical sector number TARGET_LSN is greater than the sum of the logical sector number of the last logical sector on the track X plus the track base value TBx then the internal target sector not on track flag N_TSNOT is set to a logical high voltage level at the Block 115 and the apparatus proceeds to the Block 116, otherwise the apparatus skips the Block 115 and jumps directly to the Block 116.

At the Block 116 it is determined if the value stored in the skew adjusted physical sector number register S_PSN is greater than or equal to the number of logical sectors per track L. If the value stored in the skew adjusted physical sector number register S_PSN is not greater than or equal to the number of logical sectors per track L then the apparatus jumps to the Block 119, otherwise at the Block 117 it is determined if the value stored in the next logical sector number register N_LSN is greater than or equal to the sum of the number of logical sectors per track L plus the value TBx. If the value stored in the next logical sector number register N_LSN is less than the sum of the number of logical sectors per track L plus the value TBx then the apparatus jumps to the beginning of the subroutine E otherwise at the Block 118 the value stored in the next logical sector number register N_LSN is set equal to a hexadecimal value FF. After the Block 118 the apparatus jumps to the beginning of the subroutine E.

DESCRIPTION OF THE SUBROUTINE E

Figure 11:
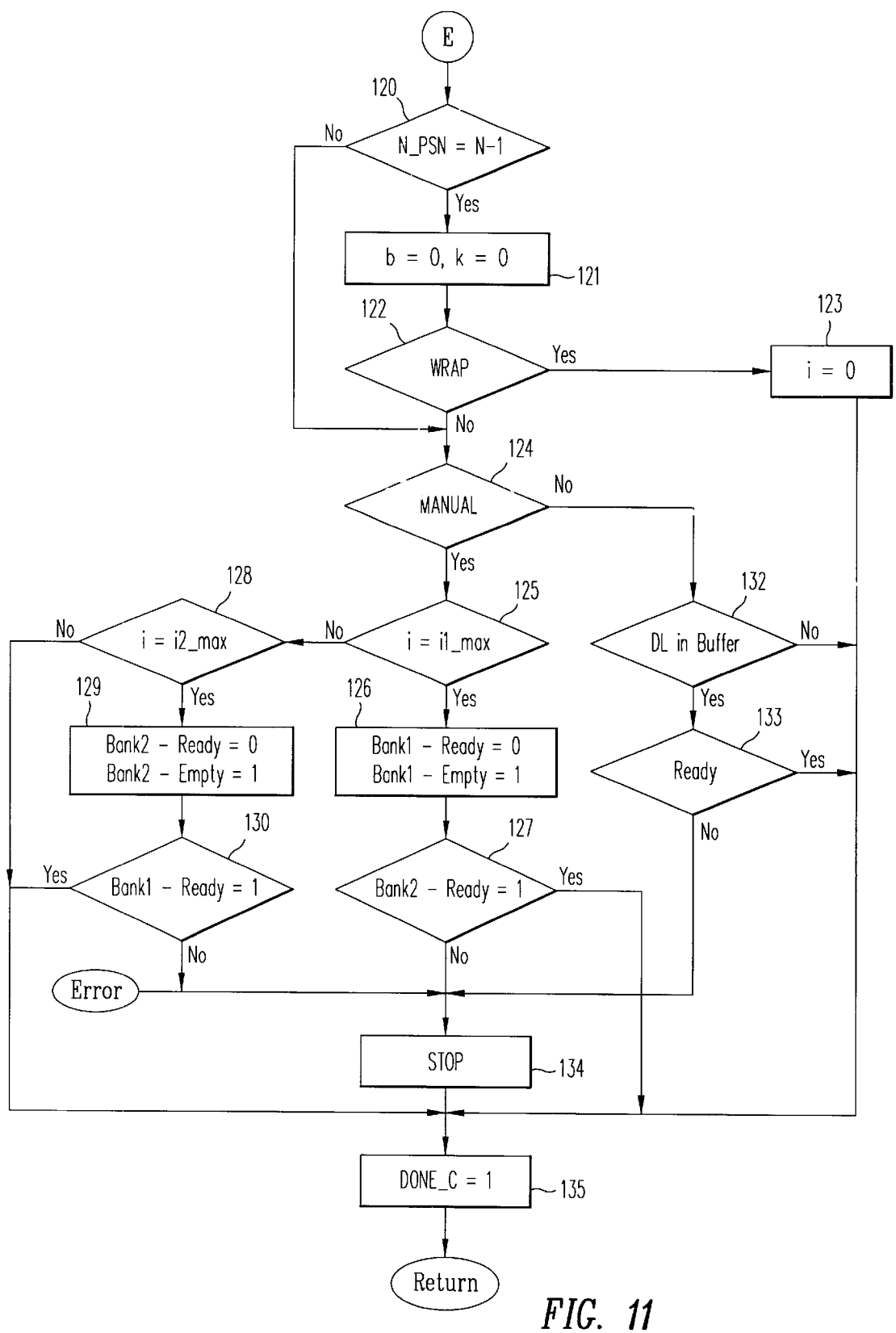
FIG. 11 illustrates a flow chart of the subroutine E of the present invention.

The subroutine E, illustrated in FIG. 11, begins at the Block 120 and controls the loading of the first and second banks of the FIFO. At the Block 120 the apparatus of the present invention determines if the value in the internal physical sector number register N_PSN is equal to the number of physical sectors on the track N minus one. If the value in the internal physical sector number register N_PSN is equal to the number of physical sectors on the track N minus one, then the apparatus resets the number of slipped defective sectors b and the number of defect records processed in the track defect list to zero at the Block 121 and determines at the Block 122 if the wrap condition is present, otherwise the apparatus jumps to the Block 124. The wrap condition is present when the apparatus is not operating in the manual mode and the defect list size DL_SIZE is less than or equal to the size of the FIFO. If at the Block 122 the wrap condition is present then the defect FIFO pointer i is reset to zero at the Block 123 and the apparatus jumps to the Block 135. If at the Block 122 the wrap condition is not present then it is determined at the Block 124 if the apparatus is operating in manual mode indicating that the microprocessor is managing the loading of the defect list in the first and second banks of the defect FIFO in a ping-pong fashion. If the apparatus is not operating in manual mode then it is determined at the Block 132 if the defect list is in the buffer RAM. If the defect list is not in the buffer RAM then the apparatus jumps to the Block 135. If the defect list is in the buffer RAM then it is determined at the Block 133 if the system is ready. If the system is ready at the Block 133 then the apparatus jumps to the Block 135, otherwise the apparatus jumps to the Block 134.

If it is determined at the Block 124 that the apparatus of the present invention is operating in manual mode then it is next determined at the Block 125 if the defect FIFO pointer i is equal to the maximum defect pointer for the first bank i1_max. If the defect FIFO pointer i is equal to the maximum defect pointer i_max, then at the Block 126 the first bank ready flag BANK1_READY is reset to a logical low voltage level and the first bank empty flay BANK1_EMPTY is set to a logical high voltage level. At the Block 127 the apparatus determines if the second bank is ready by determining if the second bank ready flag BANK2_READY is equal to a logical high voltage level. If the flag BANK2_READY is equal to a logical high voltage level then the apparatus jumps to the Block 135, otherwise the apparatus jumps to the Block 134.

If it is determined at the Block 125 that the defect FIFO pointer i is not equal to the maximum defect pointer for the first bank i1_max then the apparatus of the present invention determines at the block 128 if the defect FIFO pointer i is equal to the maximum defect pointer for the second bank i2_max. If the defect FIFO pointer i is equal to the maximum defect pointer for the second bank i2_max then at the Block 129 the second bank ready flag BANK2_READY is reset to a logical low voltage level and the second bank empty flag BANK2_EMPTY is set to a logical high voltage level, otherwise the apparatus jumps directly to the Block 135. At the Block 130 it is determined if the first bank is ready by determining if the first bank ready flag BANK1_READY is set to a logical high voltage level. If the first bank is ready then the apparatus jumps to the Block 135, otherwise the apparatus jumps to the Block 134.

At the Block 134 the apparatus of the present invention signals a stop which indicates an error in the system. At the Block 135 the DONE_C flag is set to a logical high voltage level and the apparatus returns to the Block in the main program from where the subroutine C was called, which was either the Block 23 or the Block 32.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention. Specifically, it will be apparent to one of ordinary skill in the art that the method of the present invention could be implemented in many different ways and the apparatus disclosed above is only illustrative of the preferred embodiment of the present invention.

We claim:

1. In a data storage system comprising multiple media surfaces, each surface having a plurality of concentric tracks divided into a plurality of sectors each having a sequential physical sector number representing the number of the sector on a respective one of the plurality of concentric tracks, a plurality of cylinders each being formed from a given location of tracks on different media surfaces, physical sector number information provided by the storage system and not stored within any of the plurality of sectors, each sector comprising:

an identifier portion including a head number and a defective sector list of sector numbers for all sectors on a respective one of the plurality of concentric tracks which are to be skipped; and a data portion for storing data, the data storage system further comprising:

means for receiving a physical sector number from the data storage system and for reading the defect list from a sector of a track and for outputting a logical sector number corresponding to the physical sector number.

2. In a data storage system having multiple media surfaces, each surface having a plurality of concentric tracks subdivided into a plurality of sectors, each track including repetitively occurring prerecorded servo sectors, a plurality of cylinders each being formed from a given location of tracks on different media surfaces, and head number and sector number information provided by the data storage system, the data storage system comprising:

a cylinder number of a respective one of the plurality of concentric tracks embedded in each servo sector;

an identifier portion within each servo sector, the identifier portion including a list of defective sectors for a respective one of the plurality of concentric tracks; and means for retrieving the list of defective sectors and receiving a physical sector number from the data storage system and for translating a received physical sector number to a logical sector number from the list of defective sectors.

3. A data storage device comprising:

multiple media surfaces rotating in unison;

a plurality of transducers carried by an actuator to enable movement in unison and alignment with concentric data tracks on the multiple media surfaces, each transducer positioned in a read/write relationship with one of a series of tracks;

a plurality of cylinders each formed from a given location of tracks on different media surfaces;

a data storage device subsystem, coupled to the plurality of transducers for receiving pulses indicating physical sector locations and track start positions and outputting a physical sector number;

a plurality of sequential sectors formed on each of the series of tracks, each of said plurality of sequential sectors represented by a respective one of a plurality of actual physical sector numbers, each of said plurality of sequential sectors having an identifier portion and a data portion, the identifier portion having a head number and a defective sector list of sector numbers on a respective one of the data tracks which are to be skipped; and means, coupled to the data storage device subsystem and the plurality of transducers, for receiving a physical sector number from the data storage device subsystem and receiving the defective sector list for the track and for outputting a logical sector number corresponding to the physical sector number.

4. The data storage device of claim 3, wherein the identifier portion further includes a displacement value indicating a number of sectors a logical sector has been displaced to compensate for a defective sector.

5. The data storage device of claim 4 further comprising means for adjusting a start location for an operation in response to a skew value of the data storage device.

6. The data storage device of claim 5 wherein the identifier portion further includes a flag byte comprising a flag bit indicating that there are more than a predetermined number of defect records for a track.

7. The data storage device of claim 6, wherein said defective sector list contains an identification of all sectors in a track which are to be skipped, the identifier portion of each sector providing position information for deriving a position of every logical sector in the track.

8. The data storage device of claim 7 wherein the identifier portion and the data portion of each sector are recorded as a single consecutive sequence of data bits.

9. The data storage device of claim 8, wherein the sector data portion further includes an error correction field for correcting errors in the consecutive sequence of bits forming the combined identifier and data sector portions.

10. The data storage device of claim 9 wherein each displacement value further includes a flag bit indicating whether a defective sector has been slipped to another sector on the track or mapped to a sector on another track.

* * * * *